United States Patent
Kunii

(10) Patent No.: US 8,419,234 B2
(45) Date of Patent: Apr. 16, 2013

(54) ILLUMINATION DEVICE, DISPLAY DEVICE, AND TELEVISION RECEIVER APPARATUS

(75) Inventor: Hiroshi Kunii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 344 days.

(21) Appl. No.: 12/867,590

(22) PCT Filed: Jan. 26, 2009

(86) PCT No.: PCT/JP2009/051218
§ 371 (c)(1),
(2), (4) Date: Aug. 13, 2010

(87) PCT Pub. No.: WO2009/107434
PCT Pub. Date: Sep. 3, 2009

(65) Prior Publication Data
US 2010/0321593 A1  Dec. 23, 2010

(30) Foreign Application Priority Data
Feb. 28, 2008  (JP) ................................. 2008-048558

(51) Int. Cl.
*G02F 1/13357* (2006.01)
*G02F 1/133* (2006.01)

(52) U.S. Cl.
USPC ........... 362/362; 362/97.1; 362/221; 361/752

(58) Field of Classification Search .................. 362/97.1, 362/365, 362, 221; 439/78–79; 349/61; 361/752; 348/794
See application file for complete search history.

(56) References Cited

U.S. PATENT DOCUMENTS

| | | | | |
|---|---|---|---|---|
| 7,378,794 B2 * | 5/2008 | Kim | ............................... | 313/582 |
| 2008/0188099 A1 * | 8/2008 | Takahashi | ........................ | 439/77 |
| 2009/0033221 A1 * | 2/2009 | Lee | ................................ | 313/582 |

FOREIGN PATENT DOCUMENTS

| | | |
|---|---|---|
| JP | 2002-268573 A | 9/2002 |
| JP | 2004-342325 A | 12/2004 |
| JP | 2006-253116 A | 9/2006 |

OTHER PUBLICATIONS

Official Communication issued in International Patent Application No. PCT/JP2009/051218, mailed on Apr. 7, 2009.

* cited by examiner

*Primary Examiner* — Karabi Guharay
(74) *Attorney, Agent, or Firm* — Keating & Bennett, LLP

(57) ABSTRACT

An illumination device 12 according to the present invention includes a light source 17 a chassis 14 that houses the light source 17 and a power supply board 32 for supplying drive power to the light source 17. The power supply board 32 is mounted on a surface of the chassis 14 on an opposite side from the light source 17. The chassis 14 has a raised portion 50 that is a part of the surface of the chassis 14 on the opposite side from the light source 17 and raised toward the side on which the power supply board 32 is mounted. The power supply board 32 is arranged so as to overlap the raised portion 50.

15 Claims, 23 Drawing Sheets

ILLUMINATION DEVICE, DISPLAY DEVICE, AND TELEVISION RECEIVER APPARATUS

TECHNICAL FIELD

The present invention relates to an illumination device, a display device, and a television receiver apparatus.

BACKGROUND ART

For example, since a liquid crystal panel used in a liquid crystal display device such as a liquid crystal television is not self-luminous, such a liquid crystal panel separately requires a backlight unit as an illumination device. Such a backlight unit is intended to be installed on a rear side (a side opposite to a display screen) of a liquid crystal panel and, for example, includes: a metallic chassis having an opened face on the liquid crystal panel-side; a large number of linear light sources (for example, cold cathode tubes) housed in the chassis; and an inverter board that is arranged on a rear-surface side (a side opposite to the liquid crystal panel) of the chassis and that supplies driving power to the linear light sources.

A connector is arranged on the inverter board. An electrically-connected state between the inverter board and a linear light source is formed by connecting a harness extending from the connector to an electrode line protruding from an end part of the linear light source. In this case, for example, when a vertical pressing force is applied to a board surface of the inverter board during a mounting operation of a connector, a localized distortion of the inverter board occurs and, in some cases, may result in a breakage of the inverter board. In order to suppress such distortion of an inverter board, means involving interposing a spacer between the inverter board and a chassis is known (see Patent Document 1).

Patent Document 1: Japanese Patent Laid-Open No. 2002-268573

Problems to be Solved by the Invention

Meanwhile, in recent years, demands for thinner liquid crystal display devices have increased. In order to achieve such thinning, the distance between the chassis and the inverter board is desirably minimized. However, minimizing the distance between the chassis and the inverter board in this manner makes it difficult to interpose the spacer according to Patent Document 1 described above between the chassis and the inverter board. In addition, since the distance between the chassis and the inverter board is reduced, there is a risk that the inverter board may come into contact with the chassis even when a slight distortion of the inverter board occurs. As such, distortion of the inverter board must be suppressed more reliably in order to realize a thinner liquid crystal display device.

DISCLOSURE OF THE INVENTION

The present invention has been made in consideration of circumstances such as described above, and an object thereof is to provide an illumination device having high yield at low cost achieved by reducing strain of an inverter board with a simple configuration. Another object of the present invention is to provide a display device including such an illumination device and a television receiver apparatus including the display device.

Means for Solving the Problems

In order to solve the problems described above, an illumination device according to the present invention includes a light source, a chassis that houses the light source and a power supply board for supplying drive power to the light source. The power supply board is mounted on a surface of the chassis on an opposite side from the light source. The surface of the chassis has a raised portion that rises toward the power supply board. The power supply board is arranged so as to overlap the raised portion.

According to such a configuration, the power supply board is arranged so as to overlap the raised portion that is formed such that a part of the chassis is raised. Therefore, bending of the power supply board toward the power supply board more than a specific amount is restricted by the raised portion even when the power supply board is pushed toward the chassis. Damages that result from the bending are less likely to occur and thus the yield of the illumination device improves.

The configuration in which the raised portion is formed by raising a part of the chassis by a drawing process can be applied for a thin illumination device. Generally, the power supply board for supplying drive power to the light source is mounted to a surface of the chassis on the opposite side from a surface on which the light source is arranged. Therefore, the distance between the chassis and the power supply board needs to be reduced to reduce the thickness of the illumination device. To separate the power supply board from the chassis, a spacer may be provided between the power supply board and the chassis. However, placing the spacer between the power supply board and the chassis is difficult when the distance between them is small.

According to the present configuration, the raised portion is formed in advance by raising a part of the chassis toward the power supply board. The raised portion functions as a spacer between the chassis and the power supply board when the power supply board is mounted on the chassis. Therefore, even when the distance between the chassis and the power supply board is small, a raised portion that functions as a spacer is provided. Moreover, a spacer is not required and thus the number of parts can be reduced.

BEST MODE FOR CARRYING OUT THE INVENTION

First Embodiment

A first embodiment of the present invention will be described with reference to FIGS. 1 to 8. First, a configuration of a television receiver apparatus TV including a liquid crystal display device 10 will be described with reference to FIGS. 1 to 4.

Figure 1:
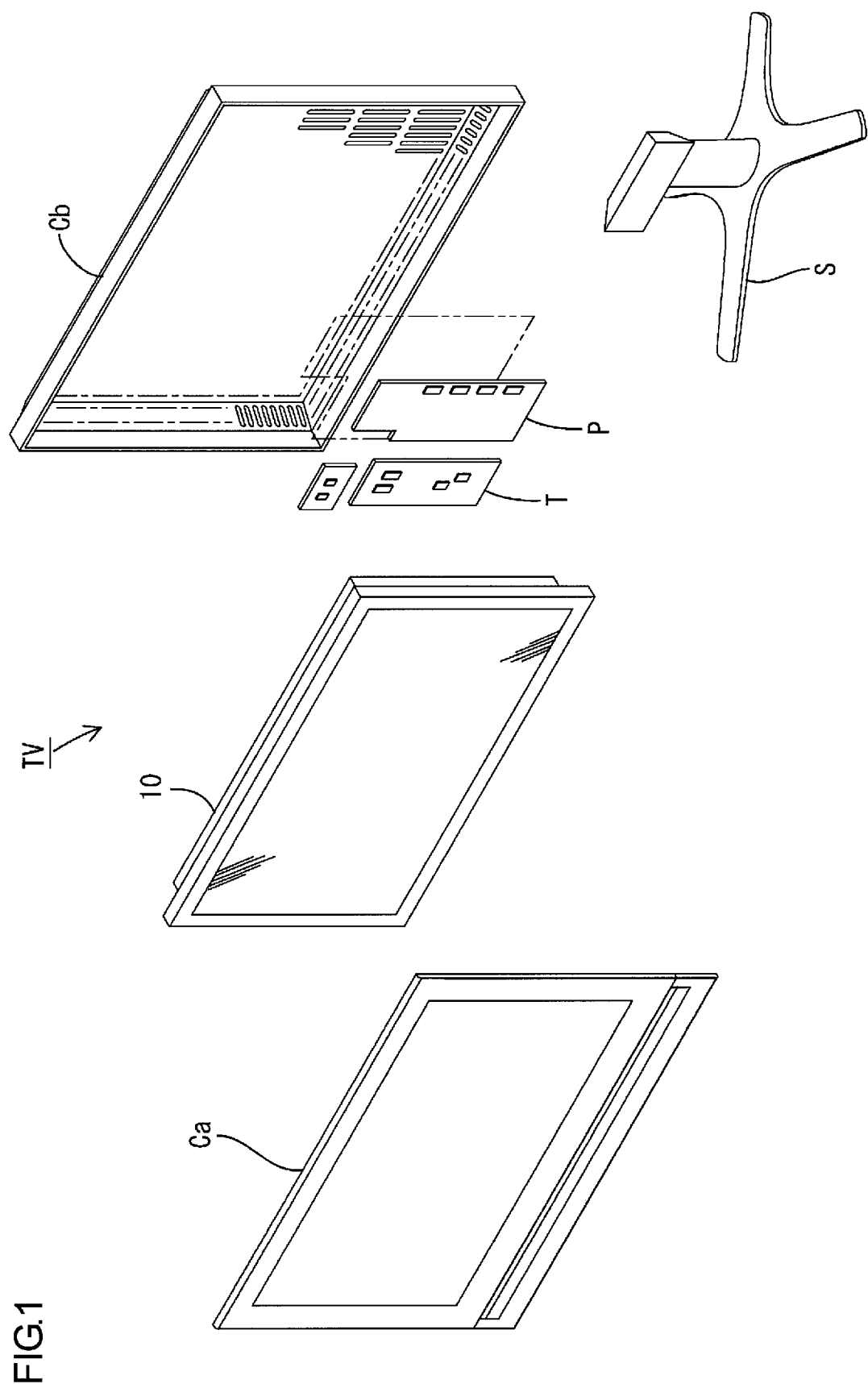
FIG. 1 is an exploded perspective view illustrating a schematic configuration of a television receiver apparatus according to a first embodiment of the present invention.
Figure 2:
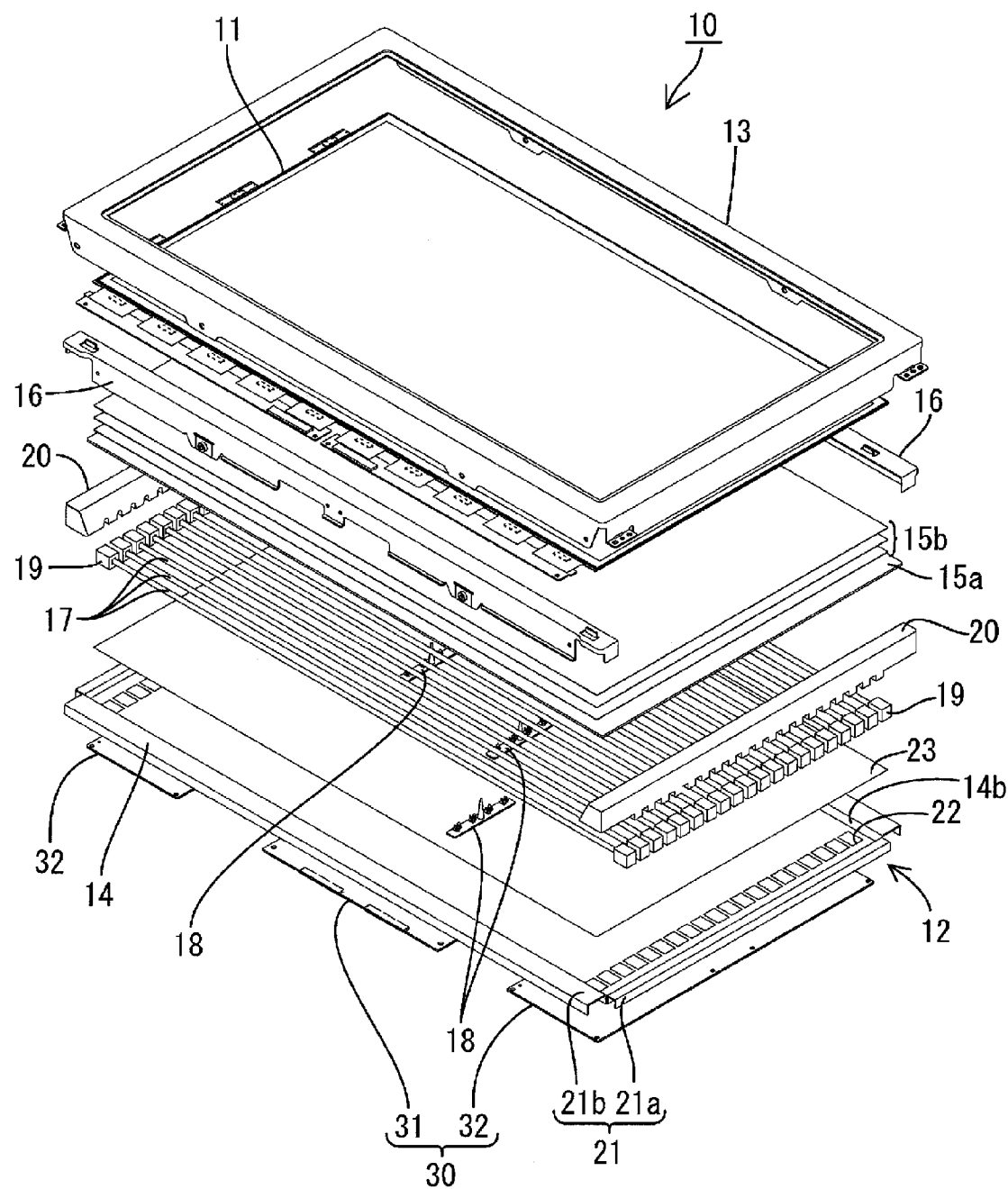
FIG. 2 is an exploded perspective view illustrating a schematic configuration of a liquid crystal display device included in the television receiver apparatus.
Figure 3:
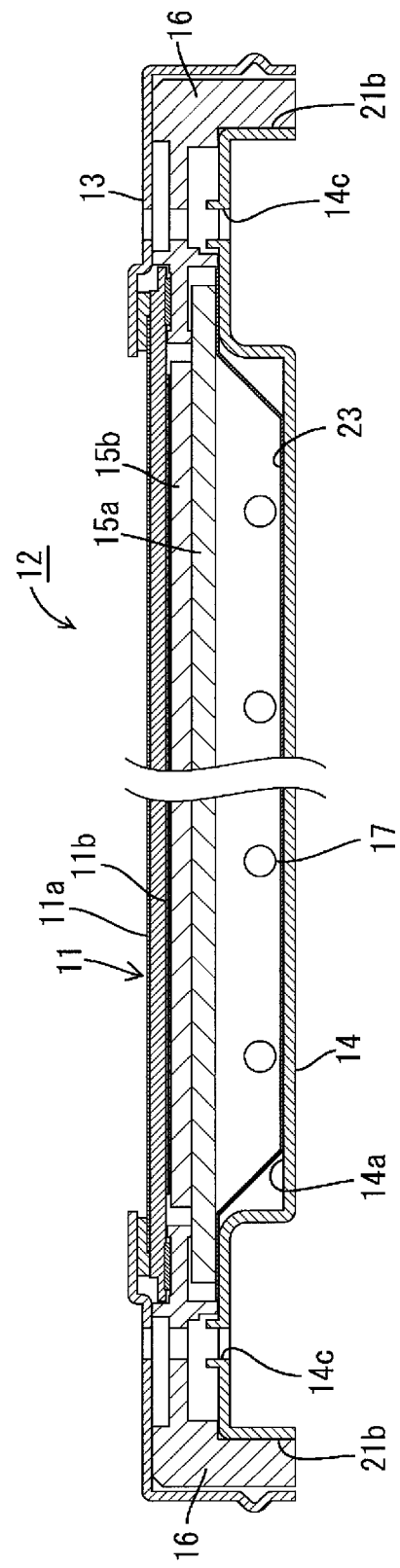
FIG. 3 is a cross-sectional view illustrating a cross-sectional configuration of the liquid crystal display device in a short-side direction thereof.
Figure 4:
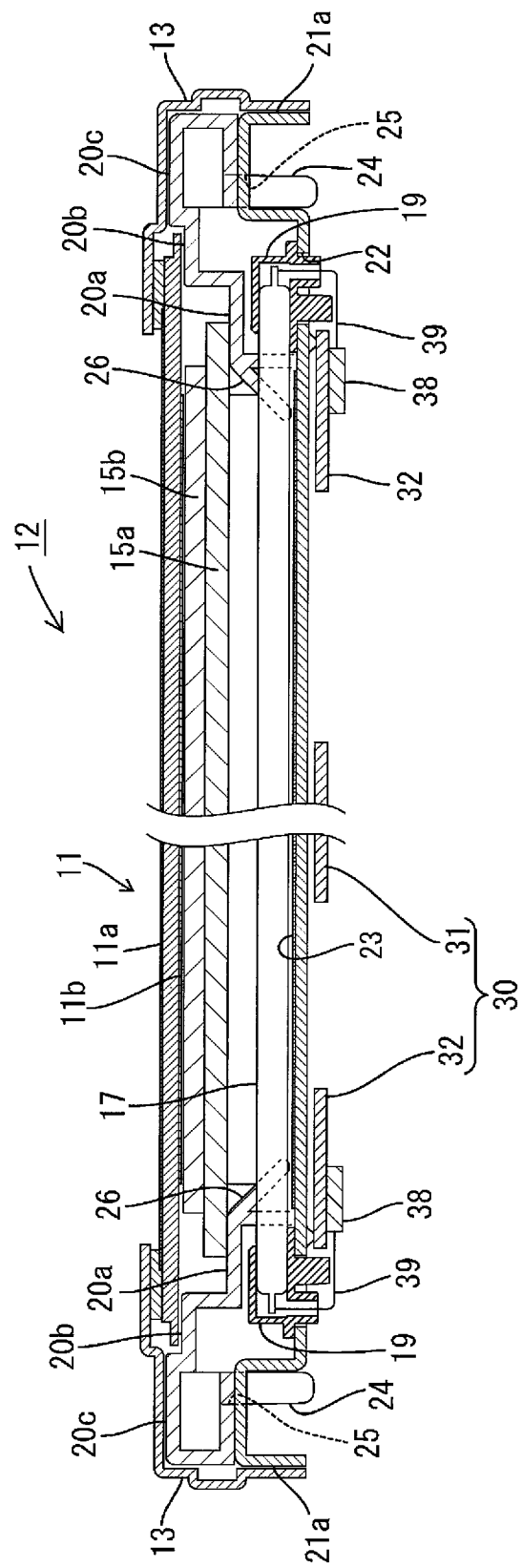
FIG. 4 is a cross-sectional view illustrating a cross-sectional configuration of the liquid crystal display device in a long-side direction thereof.

FIG. 1 is an exploded perspective view illustrating a schematic configuration of a television receiver apparatus according to the present embodiment. FIG. 2 is an exploded perspective view illustrating a schematic configuration of a liquid crystal display device included in the television receiver apparatus illustrated in FIG. 1. FIG. 3 is a cross-sectional view illustrating a cross-sectional configuration of the liquid crystal display device illustrated in FIG. 2 in a short-side direction thereof. FIG. 4 is a cross-sectional view illustrating a cross-sectional configuration of the liquid crystal display device illustrated in FIG. 2 in a long-side direction thereof.

As illustrated in FIG. 1, the television receiver apparatus TV according to the present embodiment includes: the liquid crystal display device (display device) 10; front and rear cabinets Ca and Cb that house the liquid crystal display device 10 so as to sandwich the same; a power source P; a tuner T; and a stand S. The liquid crystal display device 10 as a whole forms a horizontally long rectangle and is housed in an upright state. As illustrated in FIG. 2, the liquid crystal display device 10 includes a liquid crystal panel (display panel) 11 that is a display panel and a backlight unit (illumination device) 12 that is an external light source. The liquid crystal panel 11 and the backlight unit 12 are integrally held by a frame-like bezel 13 and the like.

Next, the liquid crystal panel 11 and the backlight unit 12 comprising the liquid crystal display device 10 will be described (see FIGS. 2 to 4).

For the liquid crystal panel 11, a pair of glass substrates is pasted together while being separated by a predetermined gap and liquid crystals are sealed between the two glass substrates. One of the glass substrates is provided with a switching element (for example, a TFT) connected to a source wiring and a gate wiring that intersect each other at right angles, a pixel electrode connected to the switching element, an alignment layer, and the like. The other glass substrate is provided with a color filter on which respective colored portions such as R (red), G (green) and B (blue) are arranged in a predetermined alignment, a counter electrode, an alignment layer, and the like. Moreover, polarizing plates 11a and 11b are arranged on the outsides of both substrates (see FIGS. 3 and 4).

As illustrated in FIG. 2, the backlight unit 12 includes: an approximately box-shaped chassis 14 having an opening 14b on a light outputting surface-side (a side of the liquid crystal panel 11); a diffusing plate 15a arranged so as to cover an opening 14b of the chassis 14; a plurality of optical sheets 15b arranged between the diffusing plate 15a and the liquid crystal panel 11; and a frame 16 arranged along a long side of the chassis 14 that holds a long-side edge part of the diffusing plate 15a by sandwiching the same between the chassis 14. Furthermore, the chassis 14 is interiorly provided with: a cold cathode tube (light source, linear light source) 17; a lamp clip 18 for mounting the cold cathode tube 17 to the chassis 14; relay connectors 19 responsible for relaying electrical connections at each end part of the cold cathode tube 17; and a holder 20 that covers all of the end parts of the group of cold cathode tubes 17 and the group of relay connectors 19. Moreover, at the backlight unit 12, the diffusing plate 15a is closer to the light output side than the cold cathode tube 17.

The chassis 14 is metallic and is sheet-metal processed and molded into a shallow, approximately box shape made up of: a rectangular bottom plate 14a; and a folded outer edge part 21 rising from the respective sides of the bottom plate 14a and folded in an approximate U-shape (a folded outer edge part 21a in a short-side direction and a folded outer edge part 21b in a long-side direction). A plurality of mounting holes 22 for mounting the relay connectors 19 is drilled on both longitudinal end parts of the bottom plate 14a of the chassis 14. In addition, as illustrated in FIG. 3, a fixing hole 14c is drilled into an upper surface of the folded outer edge part 21b of the chassis 14. For example, the fixing hole 14c enables the bezel 13, the frame 16, the chassis 14 and the like to be integrated by a screw or the like.

A reflection sheet 23 is arranged on an inner-surface side (a side of the surface opposing the cold cathode tube 17) of the bottom plate 14a of the chassis 14. The reflection sheet 23 is made of synthetic resin, has a surface colored white that is a color with superior light reflectivity, and is laid along an inner surface of the bottom plate 14a of the chassis 14 so as to approximately cover the entire area of the bottom plate 14a of the chassis 14. As illustrated in FIG. 3, a long-side edge part of the reflection sheet 23 rises so as to cover the folded outer edge part 21b of the chassis 14 and is sandwiched between the chassis 14 and the diffusing plate 15a. The reflection sheet 23 enables light outputted from the cold cathode tube 17 to be reflected to the side of the diffusing plate 15a. Meanwhile, an inverter board set 30 is formed on an outer-surface side (a side opposite to the cold cathode tube 17) of the bottom plate 14a of the chassis 14 and supplies power to the cold cathode tube 17.

The diffusing plate 15a and an optical sheet 15b are arranged on the side of the opening 14b of the chassis 14. The diffusing plate 15a is a synthetic resin plate-like member dispersedly mixed with light-scattering particles and functions to diffuse linear light outputted from the cold cathode tube 17 that is a linear light source. As described above, the short-side edge part of the diffusing plate 15a is mounted on a first surface 20a of the holder 20 and is configured so as to be unaffected by vertical binding forces. On the other hand, as illustrated in FIG. 3, the long-side edge part of the diffusing plate 15a is sandwiched between and therefore fixed by the chassis 14 (reflection sheet 23) and the frame 16.

The optical sheet 15b arranged on the diffusing plate 15a is a laminated structure of a diffusing sheet, a lens sheet, and a reflective polarizing plate, in this order, from the side of the diffusing plate 15a, and functions to convert light outputted from the cold cathode tube 17 and passed through the diffusing plate 15a into planar light. The liquid crystal panel 11 is placed on an upper-surface side of the optical sheet 15b. The optical sheet is held between the diffusing plate 15a and the liquid crystal panel 11.

Each cold cathode tube 17 has an elongated tubular shape. A large number (20 in the present embodiment) of the cold cathode tubes 17 are housed in the chassis 14 aligned parallel to each other in a state where a longitudinal direction (axial direction) of the tubes is conformed to the long-side direction of the chassis 14 (see FIG. 2). The cold cathode tubes 17 are gripped by the lamp clips 18 (not illustrated in FIGS. 3 and 4) so as to be supported in a state where a slight gap is provided between the cold cathode tubes 17 and the bottom plate 14a (reflection sheet 23) of the chassis 14. A terminal (not shown) that receives drive power is provided at each end part of the cold cathode tubes 17. Each end part is fit into the relay connector 19 and the holder 20 is mounted so as to cover the relay connectors 19.

Moreover, the present embodiment is configured such that: the cold cathode tube 17 used has a tube diameter of 4.0 mm; the distance between the cold cathode tube 17 and the reflection sheet 23 is set to 0.8 mm; the distance between adjacent cold cathode tubes 17 is set to 16.4 mm; and the distance between the cold cathode tube 17 and the diffusing plate 15a is set to 2.7 mm. As shown, thinning is applied between the respective components in the backlight unit 12. In particular, the distance between the cold cathode tube 17 and the diffusing plate 15a and the distance between the cold cathode tube 17 and the reflection sheet 23 have been reduced. Due to such thinning of the backlight unit 12, a thickness of the liquid crystal display device 10 (i.e., a thickness from a front surface of the liquid crystal panel 11 to a rear surface of the backlight unit 12) of 16 mm and a thickness of the television receiver apparatus TV (i.e., a thickness from a front surface of the front-side cabinet Ca to a rear surface of the rear-side cabinet Cb) of 34 mm are realized. As a result, a thin television receiver apparatus is achieved.

The holder 20 covering end parts of the cold cathode tubes 17 is made of white synthetic resin and, as illustrated in FIG. 2, has an approximately elongated box shape extending in the short-side direction of the chassis 14. As illustrated in FIG. 4, the holder 20 has a stepped surface configured such that the diffusing plate 15a and the liquid crystal panel 11 can be mounted on different levels of a front-surface side of the stepped surface. The holder 20 is arranged so as to partially overlap with the folded outer edge part 21a in the short-side direction of the chassis 14 and, together with the folded outer edge part 21a, forms a side wall of the backlight unit 12. An insertion pin 24 protrudes from a surface opposing the folded outer edge part 21a of the chassis 14 among the holder 20. The holder 20 is mounted onto the chassis 14 by inserting the insertion pin 24 into an insertion hole 25 formed on an upper surface of the folded outer edge part 21a of the chassis 14.

The stepped surface of the holder 20 is made up of three surfaces parallel to the bottom plate 14a of the chassis 14. A short-side edge part of the diffusing plate 15a is mounted on a lowermost first surface 20a of the stepped surface of the holder 20. In addition, an inclined cover 26 that inclines toward the bottom plate 14a of the chassis 14 extends from the first surface 20a. A short-side edge part of the liquid crystal panel 11 is mounted on a second surface 20b of the stepped surface of the holder 20. A topmost third surface 20c of the stepped surface of the holder 20 is arranged so as to overlap the folded outer edge part 21a of the chassis 14 and is in contact with the bezel 13.

Next, the inverter board set 30 arranged on the rear-surface side of the chassis 14 will be described with reference to FIGS. 5 and 6.

Figure 5:
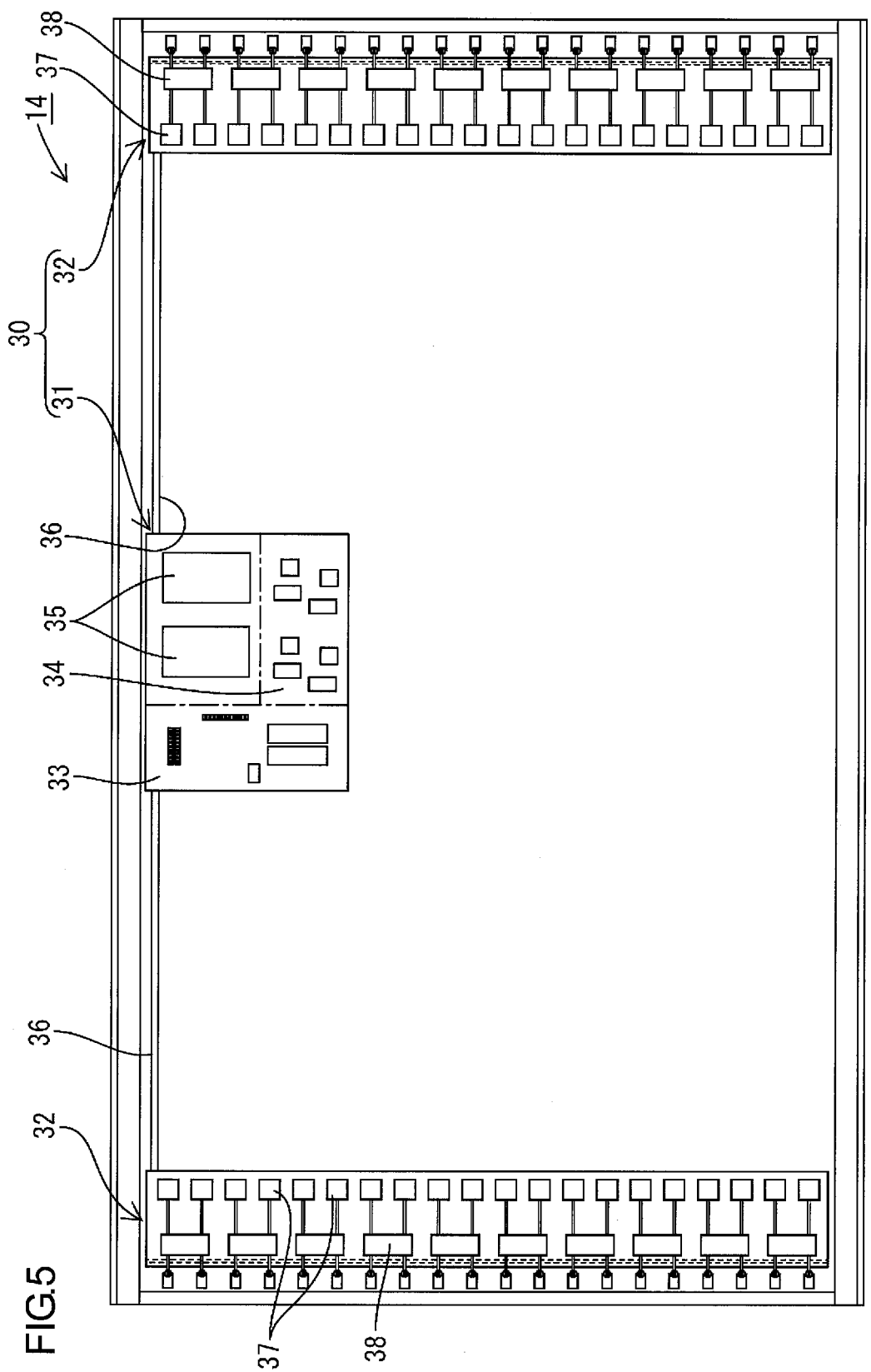
FIG. 5 is a plan view illustrating a configuration of an inverter board included in the liquid crystal display device.
Figure 6:
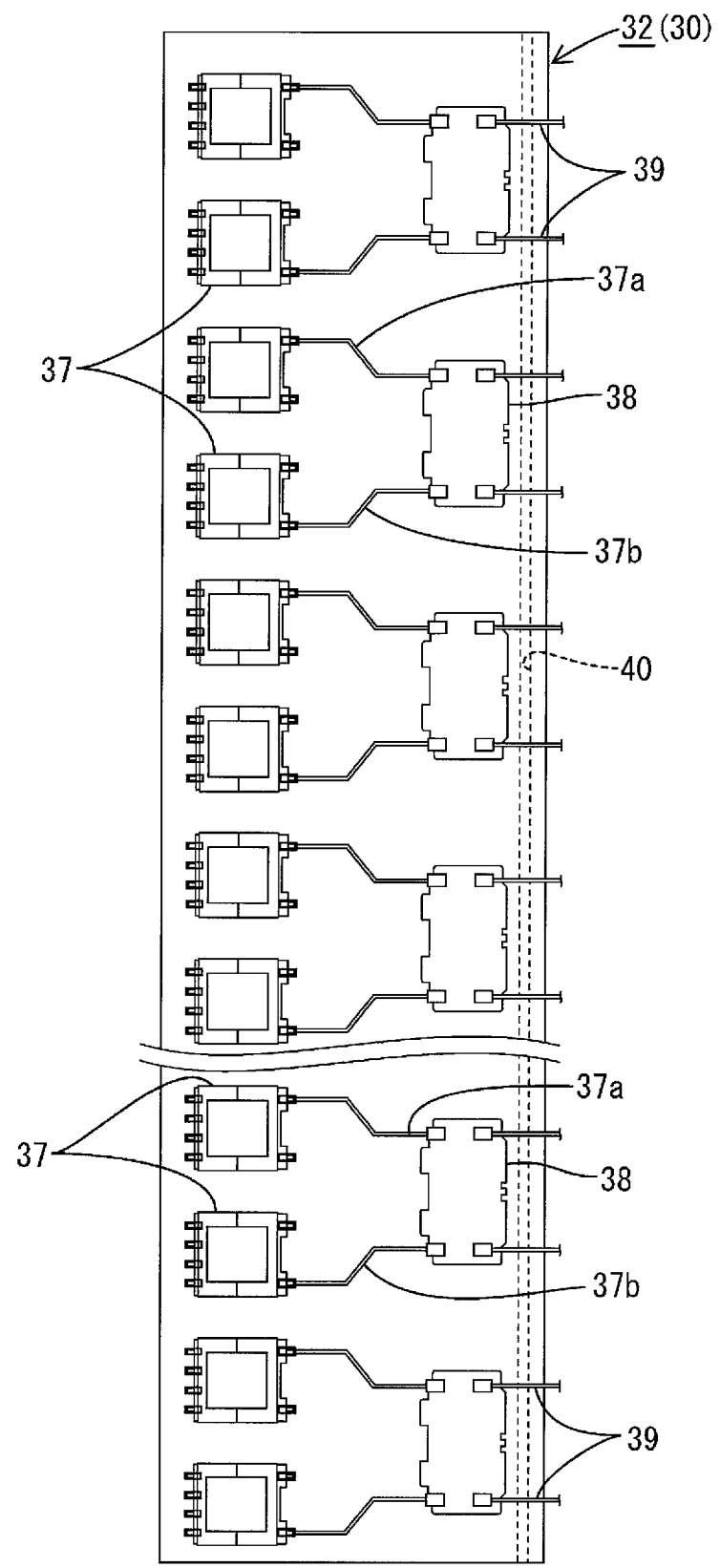
FIG. 6 is a plan view illustrating a configuration of a second inverter board comprising the inverter board illustrated in FIG. 5.

FIG. 5 is a plan view illustrating a schematic configuration of an inverter board, and FIG. 6 is a plan view illustrating a configuration of a second inverter board comprising the inverter board illustrated in FIG. 5.

As described above, the inverter board set 30 is mounted on the rear-surface side (the side opposite from the side on which the cold cathode tube 17 is arranged) of the bottom plate 14a of the chassis 14. The inverter board set supplies drive power to the cold cathode tubes 17 and controls lighting operation of the cold cathode tube 17. The inverter board set 30 includes a paper phenol or glass epoxy resin boards on which circuit patterns are formed. As illustrated in FIG. 5, the inverter board set 30 includes a first inverter board 31 arranged in a central area of the chassis 14 with respect to the long-side direction and a second inverter board (power supply board) 32 arranged in end areas of the chassis 14 with respect to the long-side direction (areas that overlap end parts of the cold cathode tube 17).

The first inverter board 31 is arranged in the central area of the chassis 14 with respect to the long-side direction and off to one side with respect to the short-side direction. The first inverter board 31 includes circuitry for controlling driving of the cold cathode tubes 17. The circuitry includes a control circuit 33, a switching circuit 34 and a high voltage circuit 35. The control circuit 33 sends a control signal to generate a predetermined frequency for controlling a power output for driving the cold cathode tubes 17. The switching circuit 34 switches on and off of supply of the drive power to switch the direction of current in the high voltage circuit 35, which will be described later, based on the control signal. The high voltage circuit 35 outputs a drive power with a voltage stepped up from an input voltage. A high-voltage line 36 extends from the first inverter board 31 to the second inverter boards 32 for transmitting the drive power to the second inverter boards. The high-voltage lines 36 are shield by insulating materials and are arranged along a long-side edge of the chassis 14 so as to be separated from the chassis 14.

The second inverter boards (power supply boards) 32 are arranged at respective end areas (areas that overlap the respective end parts of the cold cathode tubes 17) of the chassis 14 with respect to the long-side direction. Each second inverter board 32 has a circuit for supplying power to the cold cathode tubes 17 after adjusting power transmitted from the first inverter board 31. As illustrated in FIG. 6, pluralities of flux-coupling elements 37 and connectors 38 are arranged along a longitudinal direction of the second inverter board 32.

The flux-coupling elements 37 adjust the balance of currents supplied to the cold cathode tubes 17. Twenty flux-coupling elements 37 are arranged on a line in either longitudinal end area of the chassis 14 closer to the central area of the chassis 14. The connectors 38 are provided for making electrical connections between the inverter board set 30 and the cold cathode tubes 17. Ten connectors 38 are arranged on a line on the second inverter board 32 closer to either longitudinal edge of the chassis 14. The connectors 38 are arranged such that end parts of two cold cathode tubes 17 overlap a single connector 38. The flux-coupling elements 37 and the connectors 38 are electrically connected to each other by connecting conductive lines 37a and 37b extending from the respective flux-coupling elements 37 to a corresponding one of the connectors 38. The second inverter board 32 in the present embodiment is configured so as to include a circuit formed for ensuring the balance of a light source current by series-connecting secondary currents flowing through a plurality of cold cathode tubes 17 using the flux-coupling element 37. However, for example, the circuit may be replaced with a shunt tournament circuit of a light source current using a flux-coupling element or a ballast element alignment circuit.

Each connector 38 has two harnesses 39 extending from a short-side side of the chassis 14. The extended ends of the connector 38 are connected to terminals respectively provided on end parts of different cold cathode tubes 17 in the relay connector 19. In other words, a configuration is adopted in which one connector 38 is connected to two cold cathode tubes 17. The harness 39 functions as a power transmission line. Drive power outputted from the first inverter board 31 is supplied to the cold cathode tubes 17 via the flux-coupling elements 37, the connectors 38, and the harnesses 39.

A single groove (recessed portion) 40 (depicted by dashed lines in FIGS. 5 and 6) is formed along a longitudinal direction on a rear-surface side (a surface on the opposite side to the surface on which the flux-coupling elements 37 and the connectors 38 are arranged, a surface opposing the bottom plate 14a of the chassis 14) of each second inverter board 32. The groove 40 extends substantially parallel to the line on which the connectors 38 are arranged. It is provided in an area of the rear surface of the inverter board 32 on a side slightly closer to the longitudinal side edge (i.e., outside) than an area that overlaps the connectors 38. Namely, the groove 40 extends so as to correspond the line of the connectors 38. The groove 40 has a rectangular cross-section and the same length as the longitudinal length of the second inverter board 32. The groove 40 has a linear shape that extends along the long-side edge of the second inverter board 32.

Next, how the second inverter board 32 is mounted on the chassis 14 will be described with reference to FIGS. 7 and 8.

Figure 7:
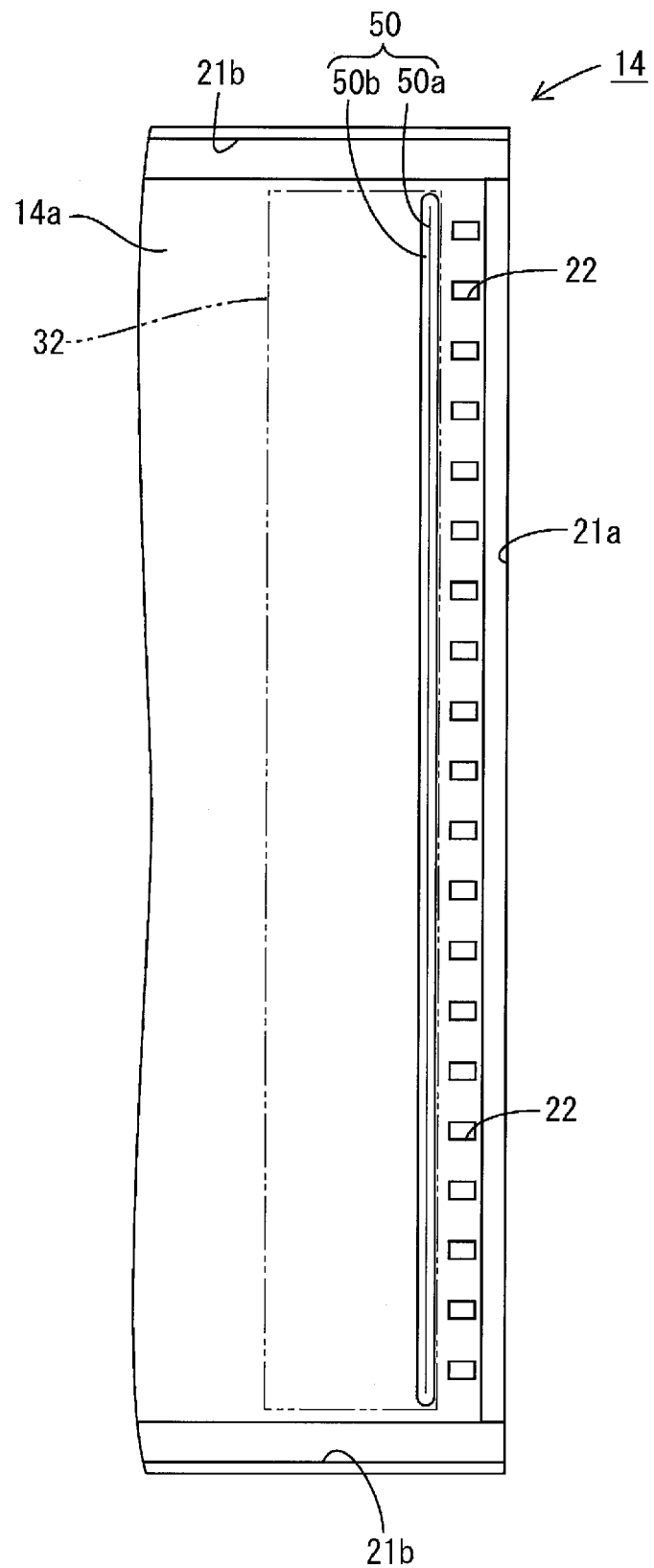
FIG. 7 is a plan view illustrating a configuration of a rear-surface side of a chassis included in the liquid crystal display device.
Figure 8:
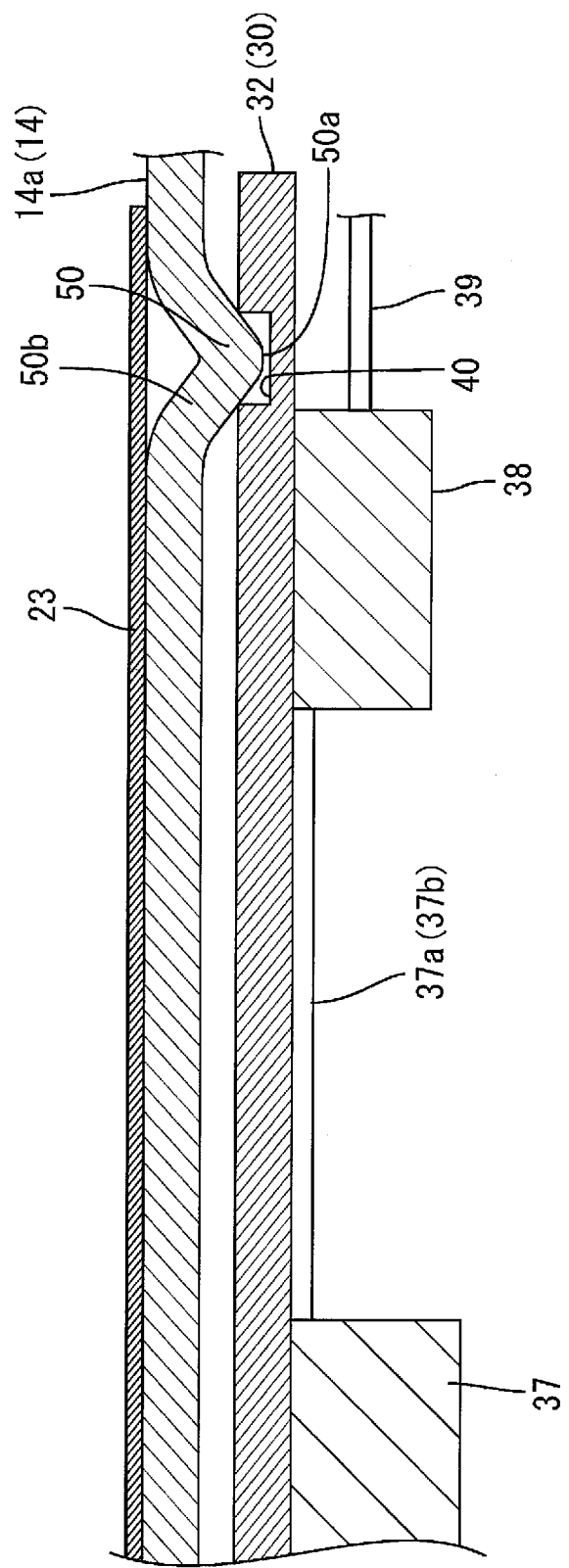
FIG. 8 is a cross-sectional view illustrating a mode of mounting of the chassis and the second inverter board.

FIG. 7 is a plan view illustrating a configuration of the rear-surface side of the chassis 14 and FIG. 8 is a cross-sectional view illustrating a mode of mounting of the chassis 14 and the second inverter board 32.

As illustrated in FIGS. 7 and 8, the bottom plate 14a of the chassis 14 has an elongated raised portion (raised portion) 50 in an area corresponding to the groove 40 described above. Namely, the elongated raised portion 50 is formed so as to overlap the second inverter board 32 included in the inverter board set 30. The elongated raised portion 50 is formed in a linear shape raised toward a side on which the inverter board set 30 is arranged (a side away from the cold cathode tubes 17) by raising a part of the bottom plate 14a by a drawing process. In other words, the elongated raised portion 50 is formed such that a portion of the bottom plate 14a is drawn out from the inside surface (the surface on which the reflection sheet 23 is laid) to the outside surface (the surface opposing the inverter board set 30). A part of the bottom plate 14a at which the elongated raised portion 50 is formed is dented from the inner surface side and covered with the reflection sheet 23 (see FIG. 8).

The elongated raised portion 50 has a substantially triangular vertical cross-section that fans out from a rounded top part 50a to a bottom part 50b on a plate-like surface side of the bottom plate 14a (see FIG. 8), and forms an approximate triangular column whose longitudinal direction is conformed to the short-side direction of the chassis 14 (the longitudinal direction of the short-side outer edge part 21a; see FIG. 7). Since the alignment direction of the connectors 38 arranged on the second inverter board 32 described above is also consistent with the short-side direction of the chassis 14, the longitudinal direction of the elongated raised portion 50 is oriented in the alignment direction of the connectors 38. The width of the top part 50a is set narrower than the width of the groove 40. Meanwhile, the width of the bottom part 50b is set wider than the width of the groove 40.

When the second inverter board 32 is mounted on the chassis 14, as illustrated in FIG. 8, the elongated raised portion 50 of the bottom plate 14a of the chassis 14 is fitted in the groove 40 in the rear surface of the second inverter board 32. Since the width of the top part 50a of the elongated raised portion 50 is narrower than the width of the groove 40 although the width of the bottom part 50b is wider than the width of the groove 40, a part of the top part 50a of the elongated raised portion 50 is fitted in the groove 40. In other words, the second inverter board 32 and the chassis 14 are separated from each other by a distance corresponding to the height of a portion of the elongated raised portion 50 outside the groove 40. This restricts the second inverter board 32 from approaching the chassis 14 at or below the aforementioned distance. In the present embodiment, to reduce the thickness of the backlight unit 12, the distance between the second inverter board 32 and the chassis 14 is set to as small as 2.0 mm.

Since the distance between the second inverter board 32 and the chassis 14 is very small, the second inverter board 32 may be bent or touch the chassis 14 when a pressing force is applied to the second inverter board 32 during mounting of the connectors 38. However, in the present embodiment, at least a part of the elongated raised portion 50, more specifically, the bottom part 50b of the elongated raised portion 50 outside the groove 40 overlaps an area of the second inverter board 32 in which the connectors 38 are arranged. Therefore, even when a pressing force is applied to the second inverter board 32 during a mounting of the connectors 38, the elongated raised portion 50 restricts bending of the second inverter board 32.

As described above, in the backlight unit 12 according to the present embodiment, the chassis 14 has the elongated raised portion 50 that is a part of the bottom plate 14a thereof and raised toward the second inverter board 32, and the second inverter board 32 is arranged so as to overlap the elongated raised portion 50.

According to such a configuration, even when a pressing force is applied to the second inverter board 32 toward the chassis 14, the second inverter board 32 comes into contact with the elongated raised portion 50 that is a part of the bottom plate 14a of the chassis 14 raised toward the second inverter board 32 and provided so as to overlap the second inverter board 32. Therefore, bending of the second inverter board 32 more than a specific amount is restricted. This contributes to reducing damages resulting from the bending of the second inverter board 32 and thus improving the yield of the backlight device 12.

Furthermore, a configuration in which the elongated raised portion 50 is a protruding part of the chassis 14 formed by a drawing process is particularly effective when thinning the backlight unit 12 as is the case with the present embodiment. In the present embodiment, for the purpose of realizing a thinner backlight unit 12, the distance between the chassis 14 and the second inverter board 32 is set extremely short to 2.0 mm. When the distance between the chassis 14 and the second inverter board 32 is extremely short as described above, it is difficult to suppress distortion of the second inverter board 32 by separately preparing a spacer and interposing the spacer between the chassis 14 and the second inverter board 32.

However, according to the present embodiment, since the elongated raised portion 50 is formed in advance by causing a part of the chassis 14 itself to protrude to the side of the second inverter board 32, the elongated raised portion 50 can function as a spacer between the chassis 14 and the second inverter board 32 during mounting of the second inverter board 32 to the chassis 14. Therefore, even when the distance between the chassis 14 and the second inverter board 32 is limited, the elongated raised portion 50 that functions as a spacer can be provided. In addition, since a spacer does not have to be separately interposed, the number of parts can be reduced.

Moreover, in the present embodiment, a configuration is adopted in which a groove 40 is provided on the second inverter board 32 at a position opposing the elongated raised portion 50 formed on the chassis 14 and the top part 50a of the elongated raised portion 50 can be fitted into the groove 40.

Due to such a configuration, by fitting a part of the elongated raised portion 50 formed on the chassis 14 into the groove 40 formed on the second inverter board 32, displacement of the second inverter board 32 with respect to the chassis 14 can be suppressed. Furthermore, distortion of the second inverter board 32 can be more reliably suppressed particularly at the portion where the groove 40 is provided.

In addition, in the present embodiment, the second inverter board 32 is arranged so as to overlap an end part of the cold cathode tube 17 among the chassis 14.

According to such a configuration, the elongated raised portion 50 is also formed so as to overlap an end part of the cold cathode tube 17. In this case, the end part of the cold cathode tube 17 corresponds to an edge part of a display screen of the liquid crystal display device 10 including the backlight unit 12 and is therefore a portion less likely to affect display quality. Therefore, with a configuration in which the second inverter board 32 is arranged so as to overlap the end part of the cold cathode tube 17, desired processing including formation of the elongated raised portion 50 can be performed without degrading product quality.

Furthermore, in the present embodiment, a connector 38 for forming an electrically-connected state between the inverter board set 30 and the cold cathode tube 17 is mounted on the second inverter board 32, and at least a part (the bottom part 50b) of the elongated raised portion 50 of the chassis 14 is formed so as to overlap a portion where the connector 38 is arranged among the second inverter board 32.

As shown, with a configuration in which the connector 38 is arranged on the second inverter board 32, there may be cases where stress is generated on the portion where the connector 38 is arranged on the second inverter board 32 during mounting of the connector 38. In consideration thereof, by forming the elongated raised portion 50 of the chassis 14 at a position where at least a part of the elongated raised portion 50 overlaps a portion where the connector 38 is arranged among the second inverter board 32, distortion at the portion where the connector 38 is arranged can be effectively suppressed.

In addition, in the present embodiment, a plurality of connectors 38 is aligned on the second inverter board 32 in a single straight alignment line.

When a plurality of connectors 38 is aligned in a single straight alignment line in this manner, pressing force is generated during mounting of the connectors 38 in concentration on a specific locality forming a straight line (band-shaped) on the second inverter board 32. As a result, a further enhanced distortion-suppressing effect can be produced on the second inverter board 32 by the elongated raised portion 50 according to the configuration of the present invention.

Furthermore, according to the present embodiment, a plurality of connectors 38 is aligned in a straight line and the elongated raised portion 50 is formed in a straight line conforming to the alignment of the connectors 38.

As described above, at a portion where the plurality of connectors 38 is aligned in a straight line, the second inverter board 32 becomes vulnerable to distortion along the alignment of the connectors 38 during mounting thereof. In consideration thereof, by forming the elongated raised portion 50 in a shape conforming to the alignment of the connectors 38, distortion of the second inverter board 32 can be effectively suppressed.

Second Embodiment

Next, a second embodiment of the present invention will be described with reference to FIG. 9. In the present second embodiment, a configuration will be presented where a relative positional relationship between an elongated raised portion and a connector has been modified. Otherwise, the present second embodiment is the same as the embodiment described above. Like parts to the embodiment described above will be denoted using like reference characters and redundant descriptions thereof will be omitted.

Figure 9:
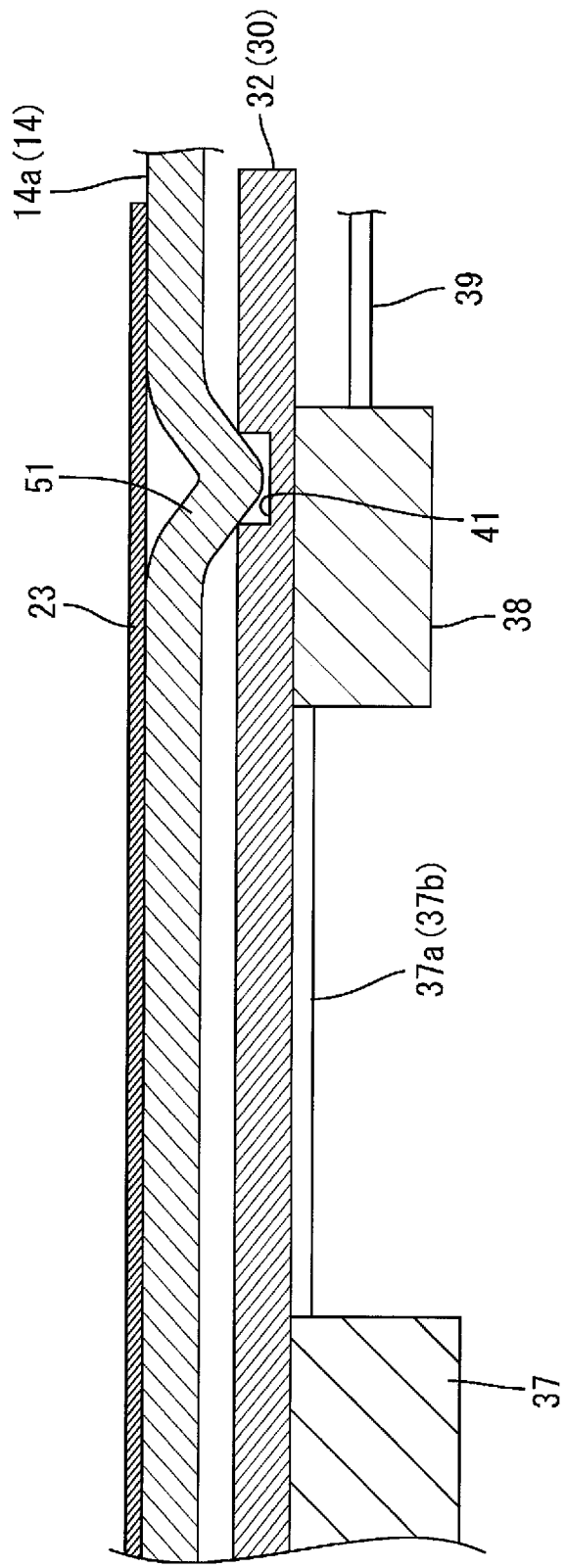
FIG. 9 is a cross-sectional view illustrating a mode of mounting of a chassis and a second inverter board included in a backlight unit according to a second embodiment of the present invention.

FIG. 9 is a cross-sectional view illustrating a mode of mounting of a chassis and a second inverter board according to the present embodiment.

As illustrated in FIG. 9, flux-coupling elements 37 and connectors 38 are respectively aligned in single straight lines on a front-surface side (an opposite side to a surface opposing a bottom plate 14a of a chassis 14) of a second inverter board 32 comprising an inverter board set 30 along a longitudinal direction of the second inverter board 32 (a short-side direction of the chassis 14). A groove 41 is extendedly provided on a rear-surface side (a surface opposing the bottom plate 14a) of the second inverter board 32 directly underneath the connectors 38 aligned in a single straight line.

Meanwhile, a elongated raised portion 51 that is a portion of the bottom plate 14a of the chassis 14 protruding toward the side of the second inverter board 32 is formed on the bottom plate 14a at a position opposing the groove 41. Moreover, the elongated raised portion 51 is configured so as to have the same shape as in the first embodiment described above.

When the second inverter board 32 is mounted on the chassis 14, a state is created in which a part of the elongated raised portion 51 formed on the bottom plate 14a of the chassis 14 is fitted into the groove 41 formed on a rear-surface side of the second inverter board 32. In this case, the groove 41 is formed directly underneath the alignment of the connectors 38 and the elongated raised portion 51 itself is also formed at a position corresponding to directly underneath the connectors 38 aligned in a straight line among the chassis 14.

This means that the second inverter board 32 is supported by the elongated raised portion 51 from the side of the chassis 14 at an alignment portion of the connectors 38.

As described above, at a portion where the plurality of connectors 38 is aligned in a straight line, pressing force is concentrated along the alignment of the connectors 38 and the second inverter board 32 becomes vulnerable to distortion during mounting of the connectors 38. In consideration thereof, by forming the elongated raised portion 51 at a position corresponding to directly underneath the alignment of the connectors 38, the pressing force-concentrated part is to be directly supported by the elongated raised portion 51. Therefore, distortion of the second inverter board 32 can be suppressed more reliably.

Third Embodiment

Next, a third embodiment of the present invention will be described with reference to FIGS. 10 to 16. In the present third embodiment, a configuration will be presented where the alignment and shape of the connector to be mounted to the inverter board have been modified. Otherwise, the present third embodiment is the same as the embodiments described above. Like parts to the embodiments described above will be denoted using like reference characters and redundant descriptions thereof will be omitted.

Figure 10:
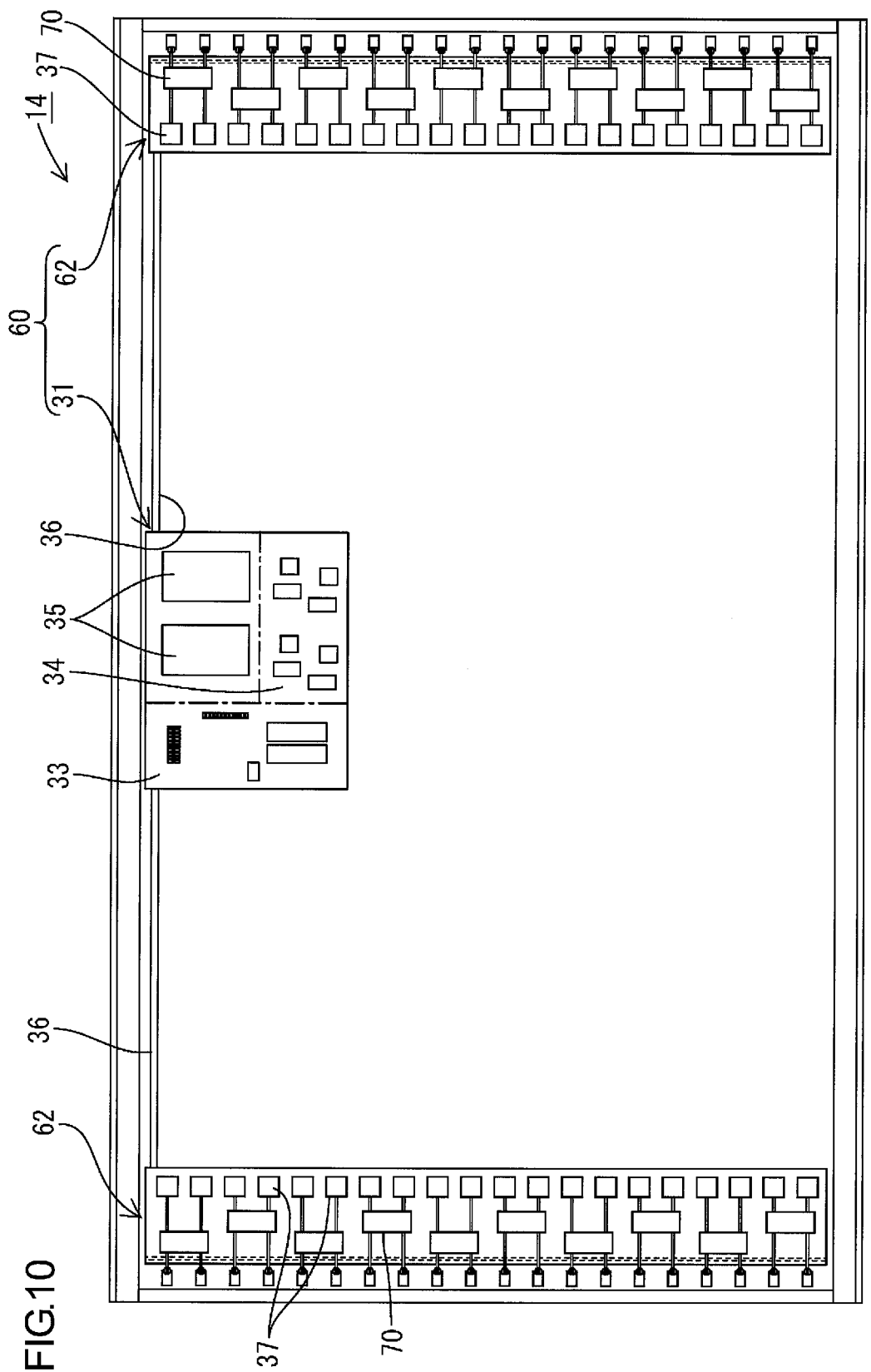
FIG. 10 is a plan view illustrating a configuration of an inverter board according to a third embodiment of the present invention.
Figure 11:
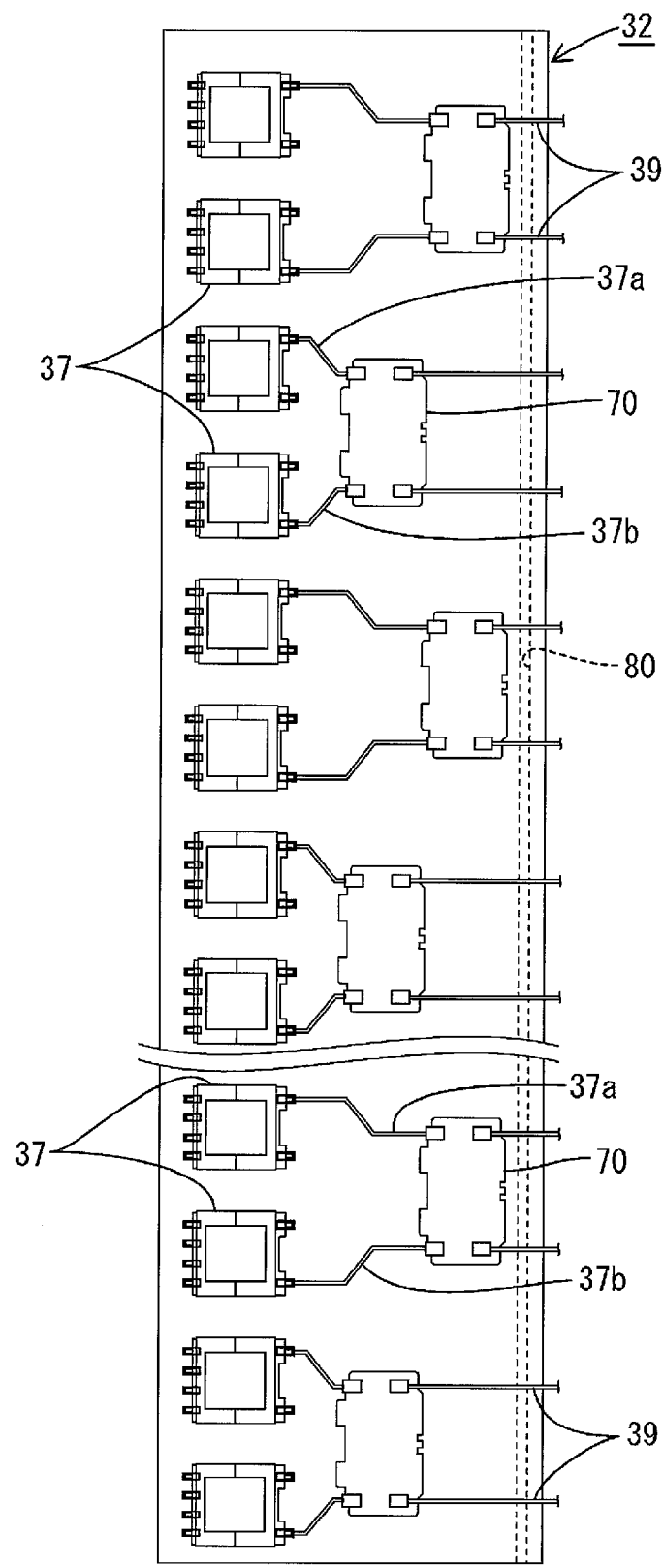
FIG. 11 is a plan view illustrating a configuration of a second inverter board comprising the inverter board illustrated in FIG. 10.
Figure 12:
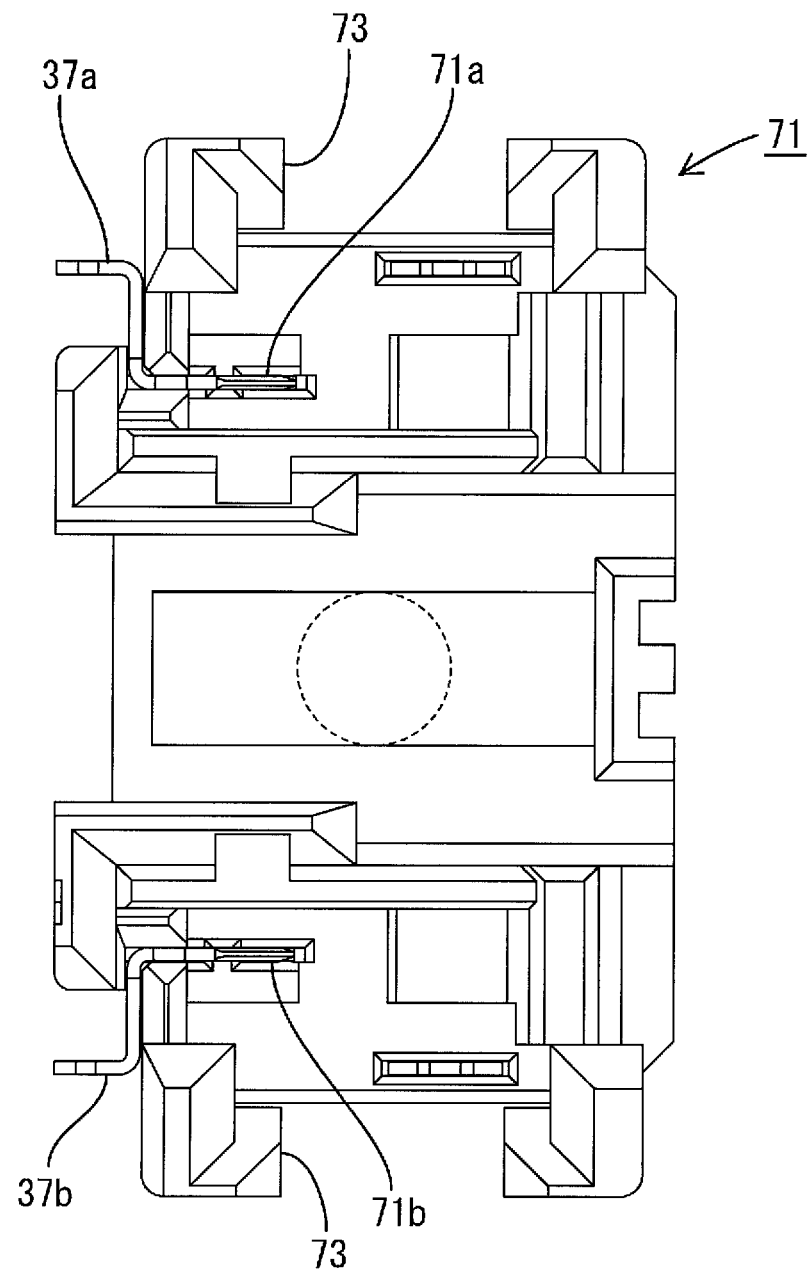
FIG. 12 is a top view of a first connector comprising a connector arranged on the second inverter board.
Figure 13:
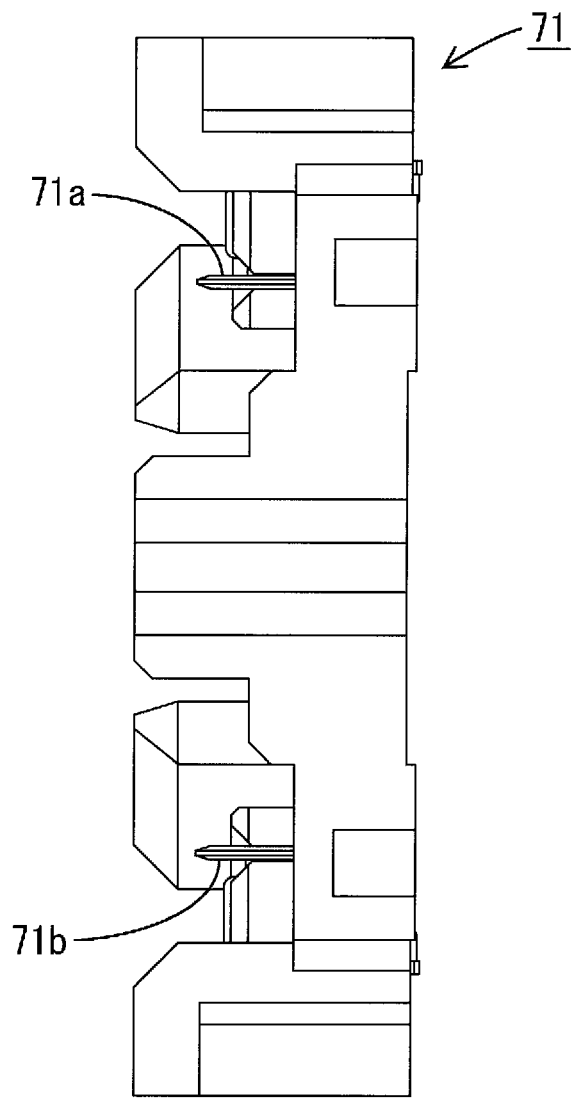
FIG. 13 is a side view of the first connector illustrated in FIG. 12.
Figure 14:
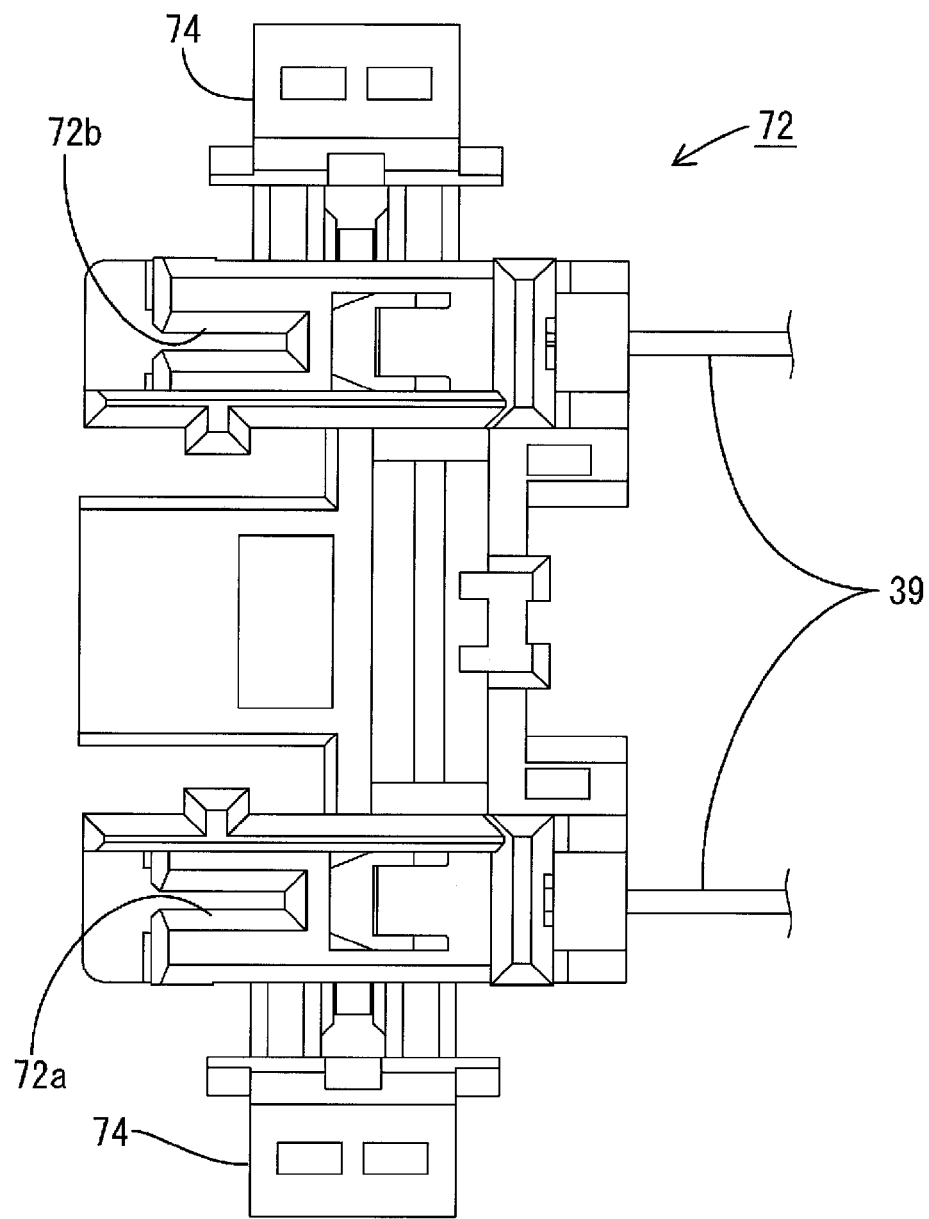
FIG. 14 is a bottom view of a second connector comprising a connector arranged on the second inverter board.
Figure 15:
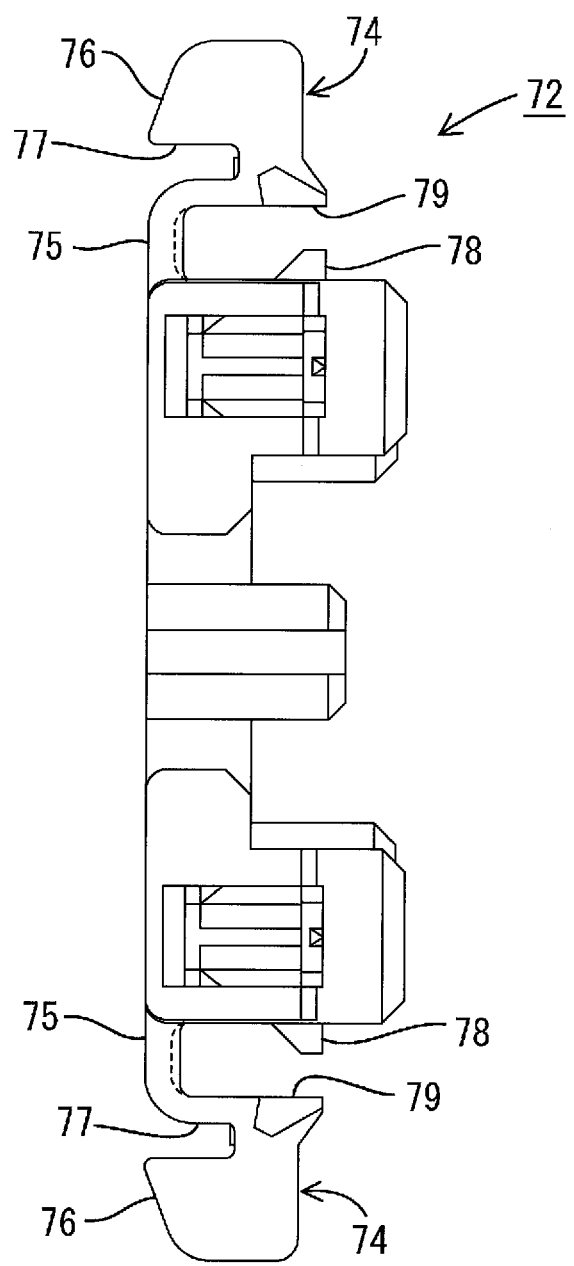
FIG. 15 is a side view of the second connector illustrated in FIG. 14.
Figure 16:
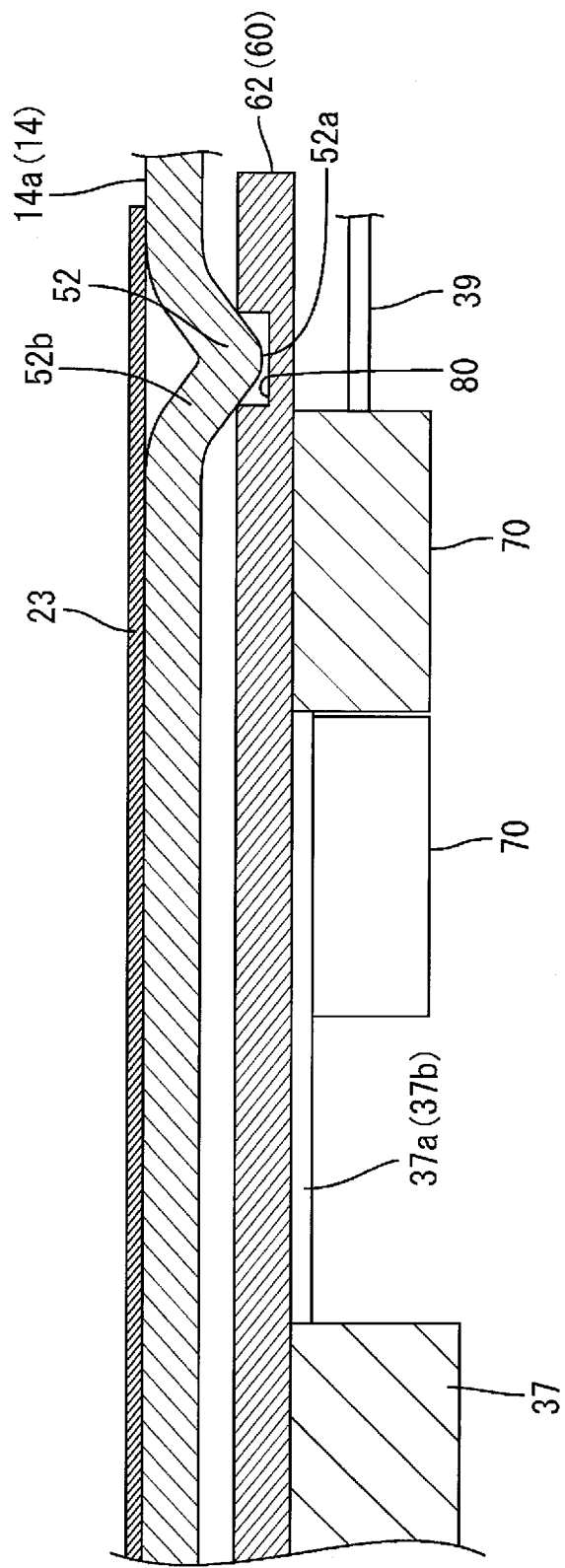
FIG. 16 is a cross-sectional view illustrating a mode of mounting of a chassis and the second inverter board.

FIG. 10 is a plan view illustrating a configuration of an inverter board according to the present third embodiment. FIG. 11 is a plan view illustrating a configuration of a second inverter board comprising the inverter board illustrated in FIG. 10. FIG. 12 is a top view of a first connector comprising a connector mounted on the second inverter board illustrated in FIG. 11. FIG. 13 is a side view of the first connector illustrated in FIG. 12. FIG. 14 is a bottom view of a second connector comprising a connector mounted on the second inverter board illustrated in FIG. 11. FIG. 15 is a side view of the second connector illustrated in FIG. 14. FIG. 16 is a cross-sectional view illustrating a mode of mounting of a chassis and the second inverter board.

An inverter board 60 is mounted on a rear-surface side (a side opposite to the side on which a cold cathode tube 17 is arranged) of a bottom plate 14a of a chassis 14 and functions to supply drive power to and control lighting behavior of the cold cathode tube 17. As illustrated in FIG. 10, the inverter board 60 includes a first inverter board 31 arranged at a central part in the long-side direction of the chassis 14 and a second inverter board 62 arranged at both end parts (portions overlapping both end parts of the cold cathode tube 17) in the long-side direction of the chassis 14.

The second inverter board 62 is configured so as to have a rectangular shape whose longitudinal direction is consistent with the short-side direction of the chassis 14. As illustrated in FIG. 11, the same number of (i.e., 20) flux-coupling elements 37 as the cold cathode tubes 17 is arranged on the second inverter board 62 close to a long-side edge located on a center side of the chassis 14. Meanwhile, a connector 70 that is connected to conductive lines 37a and 37b extending from the flux-coupling element 37 and that is responsible for providing an electrical connection between the inverter board set 30 and the cold cathode tube 17 is aligned on a long-side edge part on an end-part side of the chassis 14 among the second inverter board 62. Among the connector 70, two harnesses 39 extend from a side wall on the short-side side of the chassis 14. The extended ends of the harnesses 39 are connected to end parts of the cold cathode tube 17.

The connectors 70 are aligned in the long-side direction of the second inverter board 62 in a shape such that a single connector 70 overlaps end parts of two cold cathode tubes 17. In addition, adjacent connectors 70, 70 are alternately arranged with respect to the short-side direction of the second inverter board 62 (the long-side direction of the chassis 14) or, in other words, they are not arranged on a line. Specifically, a first connector 70 is arranged close to the long-side edge of the second inverter board 62, and a second connector 70 adjacent to the first connector 70 is arranged the width of the connector 70 inner than the first connector 70. Furthermore, a third connector 70 is arranged close to the long-side edge of the second inverter board 62, that is, aligned with the first connector 70. Conversely, the first or the third connector 70 adjacent to the second connector 70 that is on a line (on which the second, forth, sixth, . . . connectors are arranged) is not arranged on the line.

By arranging the connectors 70 as such, gaps in which the connectors 70 are not arranged are present between the adjacent connectors on each line. Namely, two lines of the connectors 70, one close to the long-side edge of the second inverter board 62 and the other more to the inside, are formed. In other words, adjacent connectors 70 are arranged so as to form a zigzag pattern along the long-side direction of the second inverter board 62 (the short-side direction of the chassis 14).

Each connector 70 includes a first connector 71 fixed on the second inverter board 62 and a second connector 72 attached to the first connector 71 so as to be detachable. The first connector 71 is made of resin and has a plate-like overall shape, and as illustrated in FIGS. 12 and 13, includes metal terminals 71a and 71b to which conductive lines 37a and 37b extending from the flux-coupling element 37 are connected. The terminals 71a and 71b include the conductive wires 37a, 37b, respectively. The conductive wires 37a, 37b are sandwiched between two metal plates, respectively. The terminals 71a and 71b rise from a plate-like surface of the first connector 71 substantially upright (see FIG. 13).

Furthermore, the side walls of the first connector 71, which face the second inverter board 62 or, in other words, opposing side walls of first connectors 71 arranged on a line and mounted are provided with lock receiving parts 73 into which locking parts 74 of the second connector 72, to be described below, are inserted.

On the other hand, the second connector 72 is made of resin and is configured so as to have an overall approximately plate-like shape, and as illustrated in FIGS. 14 and 15, includes female metal terminals 72a and 72b formed so as to receive the terminals 71a and 71b of the first connector 71. In other words, the first connector 71 and the second connector 72 are electrically connected by inserting the terminals 71a, 71b of the first connector 71 in the female terminals 72a, 72b of the second connector 72a, 72b.

Furthermore, among the second connector 72, both side walls oriented in the short-side direction of the second inverter board 62 are provided with locking parts 74 to be inserted into the lock receiving part 73 provided on the first connector 71. The locking parts 74 include a plate-like supporting portion 75 extending along an upper surface of the second connector 72 and bending toward a lower surface of the second connector 72, and a knob 76 formed cantilevered at a tip of the supporting portion 75. A distance adjusting portion 77 that opens toward the upper surface of the second connector 72 is formed between the supporting portion 75 and the knob 76. An approximately triangular projecting part 78 is formed at a portion corresponding to a lower end part of the supporting portion 75 among the second connector 72, and an opening 79 is formed between the projecting part 78 and the supporting portion 75. The locking parts 74 are made of resin and are configured so as to be elastically deformable.

An operation of mounting the second connector 72 onto the first connector 71 is to be performed as follows. First, both locking parts 74 of the second connector 72 are gripped by pinching with fingers and held so that the upper surface of the first connector 71 (see FIG. 12) fixed to the second inverter board 62 and the lower surface of the second connector 72 (see FIG. 14) oppose each other. In this state, by applying a gripping force to the locking parts 74, the following elastic deformation occurs. That is, a deformation that blocks the distance adjusting portion 77 occurs by applying a gripping force to the knob 76. As a result of the deformation, the supporting portion 75 deforms in a direction separating from the side wall of the second connector 72 and a width of the opening 79 increases. In this state, the second connector 72 is brought closer toward the first connector 71 from a direction approximately perpendicular to the upper surface of the first connector 71 or, in other words, from a direction approximately perpendicular to the board-surface of the second inverter board 62 and the locking part 74 of the second connector 72 is inserted into the lock receiving part 73 of the first connector 71. Subsequently, by releasing the fingers gripping the second connector 72, an elastic recovery of the locking part 74 occurs and the width of the opening 79 decreases to suppress separation of the second connector 72 from the first connector 71, thereby concluding the mounting operation of the first connector 71 and the second connector 72.

As described above, an mounting operation of the first connector 71 and the second connector 72 involves an operation of pressing the second connector 72 toward the first connector 71 or, in other words, pressing the second connector 72 from a direction intersecting the board-surface of the second inverter board 62.

A single groove (recessed portion) 80 (depicted by dashed lines in FIGS. 10 and 11) is formed along a longitudinal direction on a rear-surface side (a surface on the opposite side to the surface on which the flux-coupling elements 37 and the connectors 70 are arranged, a surface opposing the bottom plate 14a of the chassis 14) of the second inverter board 62 on which the connectors 70 have been mounted. The groove 80 is formed slightly toward the edge part-side (outside) from the connectors 70 arranged on the long-side edge part side of the second inverter board 62 among the rear-surface side of the second inverter board 62, and is extendedly provided approximately parallel to the alignment direction of the connectors 70 aligned so as to form two parallel rows or, in other words, in a shape conforming to the alignment of the connectors 70. The groove 80 is configured so as to have a rectangular cross-section and the same length as the longitudinal length of the second inverter board 62. In other words, the groove 80 is formed in a straight line across both longitudinal end parts of the second inverter board 62.

Meanwhile, a elongated raised portion 52 is formed on the bottom plate 14a of the chassis 14 at a position opposing the groove 80 described above or, in other words, a position overlapping the second inverter board 62 comprising the inverter board 60. Moreover, the elongated raised portion 52 is configured so as to have the same shape as in the first embodiment described above.

When the second inverter board 62 is mounted on the chassis 14, as illustrated in FIG. 16, a state is created in which the elongated raised portion 52 formed on the bottom plate 14a of the chassis 14 is fitted into the groove 80 formed on the rear-surface side of the second inverter board 62. In this state, since the width of a top part 52a among the elongated raised portion 52 is set narrower than the width of the groove 80 and the width of a bottom part 52b is set wider than the width of the groove 80, a part of the elongated raised portion 52 on the side of the top part 52a is fitted into the groove 80. In other words, a configuration is adopted in which the second inverter board 62 and the chassis 14 are separated from each other by a distance corresponding to the height of a portion of the elongated raised portion 52 that is not fitted into the groove 80 and is therefore exposed, and the second inverter board 62 is restricted from approaching the chassis 14 at or below the aforementioned distance. In addition, at least a portion of the elongated raised portion 52 or, more specifically, the bottom part 52b exposed from the groove 80 among the elongated raised portion 52 is configured so as to overlap the connector 70 arranged on the long-side edge-part side of the second inverter board 62.

As described above, with the backlight unit 12 according to the present embodiment, a plurality of connectors 70 for forming an electrically-connected state between the inverter board 60 and the cold cathode tube 17 is arranged on the second inverter board 62, and the connectors 70 include the first connector 71 mounted on the second inverter board 62 and the second connector 72 attached to the first connector 71 so as to be detachable in a direction that crosses the board surface of the second inverter board 62. Furthermore, at least a part (in this case, the bottom part 52b) of the elongated raised portion 52 formed on the chassis 14 is configured so as to overlap the connectors 70 arranged on the second inverter board 62.

According to the connector 70 configured as described above, when mounting the first connector 71 and the second connector 72, the second connector 72 is to be gripped so as to press the first connector 71 mounted on the second inverter board 62 from a direction intersecting the board surface of the second inverter board 62. In this case, a pressing force toward the side of the chassis 14 is applied to the second inverter board 62 and may generate a distortion force in the same direction. However, with the configuration according to the present invention, since the second inverter board 62 is mounted at a position overlapping the elongated raised portion 52 formed on the chassis 14 and at least a part of the elongated raised portion 52 overlaps a mounting portion of the connectors 70, bending of the second inverter board 62 around the mounting area can be effectively suppressed.

In addition, in the present embodiment, a plurality of connectors 70 is mounted on the second inverter board 62 and adjacent connectors 70 are alternately arranged so as to form two lines, one close to the edge of the second inverter board 62 and the other more to the inside.

According to such a configuration, one of the connectors 70 and adjacent connectors 70 are not on the same line. Therefore, a pressing force does not concentrate on a specific line (or band) on the second inverter board 62 during the mounting of the connectors 70. As a result, bending of a specific area of the second inverter board 62 or damages to the specific area is less likely to occur.

Furthermore, by arranging adjacent connectors 70 in a staggered layout, the intervals between adjacent connectors 70 can be increased as compared to a case where the connectors are arranged on a line. As a result, high levels of operability and safety can be ensured.

In the backlight unit 12, the second inverter board 62 is mounted on the rear surface of the chassis 14 close to the longitudinal end. The connectors 70 are mounted on each second inverter board 62 in the area that overlaps the end parts of the cold cathode tube 17. The harnesses 39 extending from the connectors 70 are connected to the end parts of the respective cold cathode tubes 17. More specifically, the connectors 70 are arranged such that one connector 70 is positioned so as to overlap end parts of two cold cathode tubes 17, and adjacent connectors 70 are aligned and arranged alternately so as to form two lines, one close to the long-side edge and the other more to the inside of the second inverter board 62. In other words, arrangement positions of the connectors 70 in the long-side direction of the second inverter board 62 (the short-side direction of the chassis 14) are determined by arrangement of the cold cathode tubes 17.

To arrange a large number of cold cathode tubes 17, intervals between adjacent cold cathode tubes 17 need to be reduced. In this case, the intervals between connectors 70 arranged within a limited area on the second inverter board 62 (corresponding to the length of the second inverter board 62 in the long-side direction thereof) also need to be reduced. When the interval between adjacent connectors 70 is reduced, the adjacent connectors 70 may become an obstacle during a mounting of the connectors 70. This makes mounting difficult and may cause a discharge between the mounted connectors 70.

According to the present invention, the connectors 70 are arranged in the staggered layout. Therefore, the gaps in which the connectors 70 are not arranged are present between the adjacent connectors 70 and thus relatively large intervals are provided between the connectors 70. As a result, a mounting of the connectors 70 can be simplified and a discharge between the connectors 70 can be suppressed, thereby ensuring high levels of operability and safety.

Modification

While the third embodiment has been described above, any arrangement mode of the connectors on the second inverter board may be adopted in the present invention as long as at least one connector among an arbitrary connector on a straight alignment line and two adjacent connectors of the arbitrary connector is arranged displaced from the alignment line. In other words, distortion force on the second inverter board can essentially be alleviated as long as a configuration is adopted where connectors are not arranged on a single straight alignment line. Accordingly, the following configurations are to be also included in the present invention.

Figure 17:
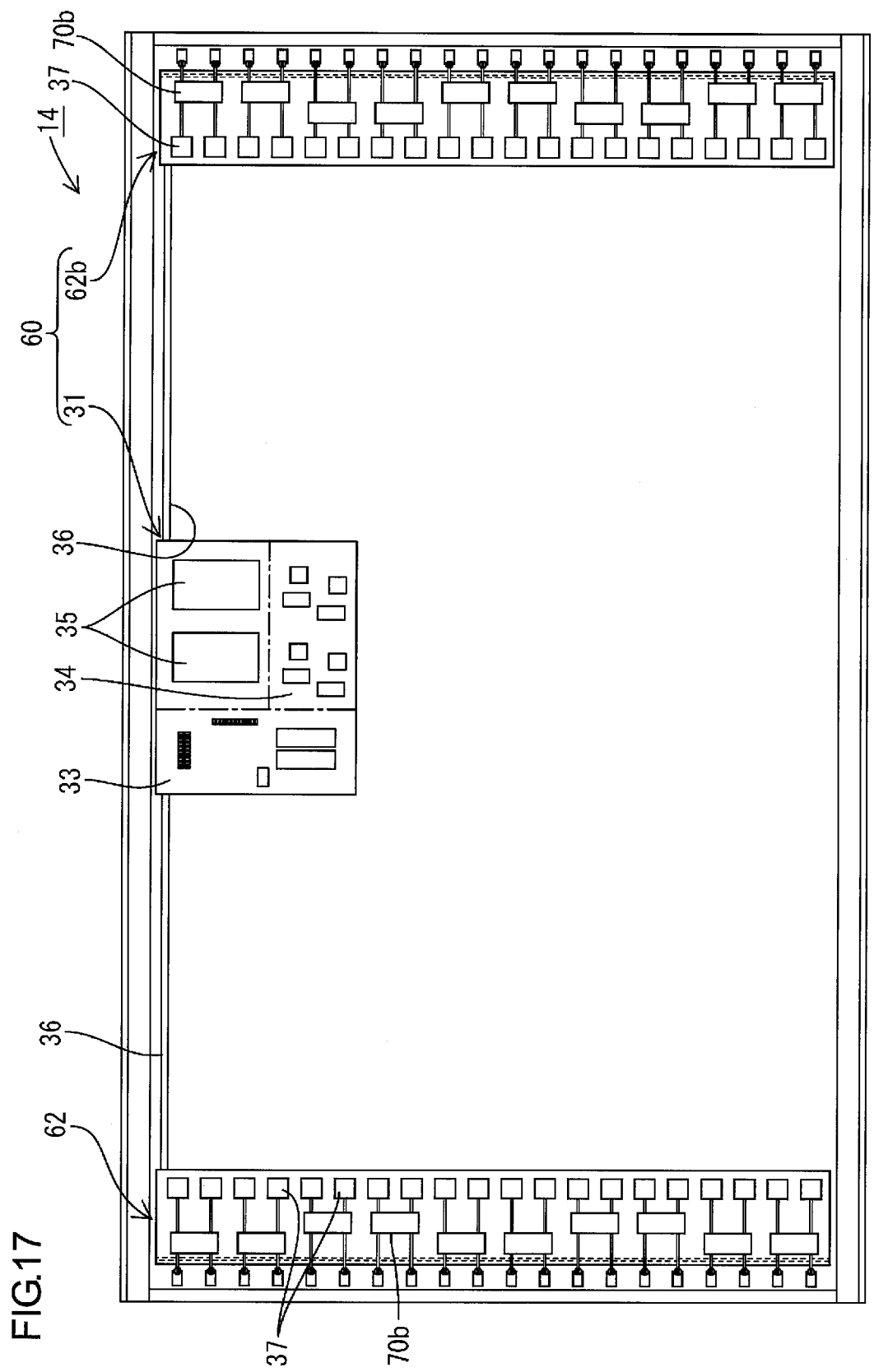
FIG. 17 is a plan view illustrating a modification of a mode of arrangement of the connectors on the second inverter board.

As an arrangement mode of connectors on the second inverter board, for example, an arrangement mode where connectors 70b are alternately arranged two at a time so as to form two rows as illustrated in FIG. 17 is to be also included in the present invention. Specifically, a first connector 70b and a second connector 70b adjacent to the first connector 70b are arranged on a long-side edge part of a second inverter board 62b, while a third connector 70b adjacent to the second connector 70b and a fourth connector 70b adjacent to the third connector 70b are arranged on the inward side of the long-side edge part of the second inverter board 62b. By repeating this procedure, connectors 70b are to be alternately arranged two at a time so as to form two rows.

Figure 18:
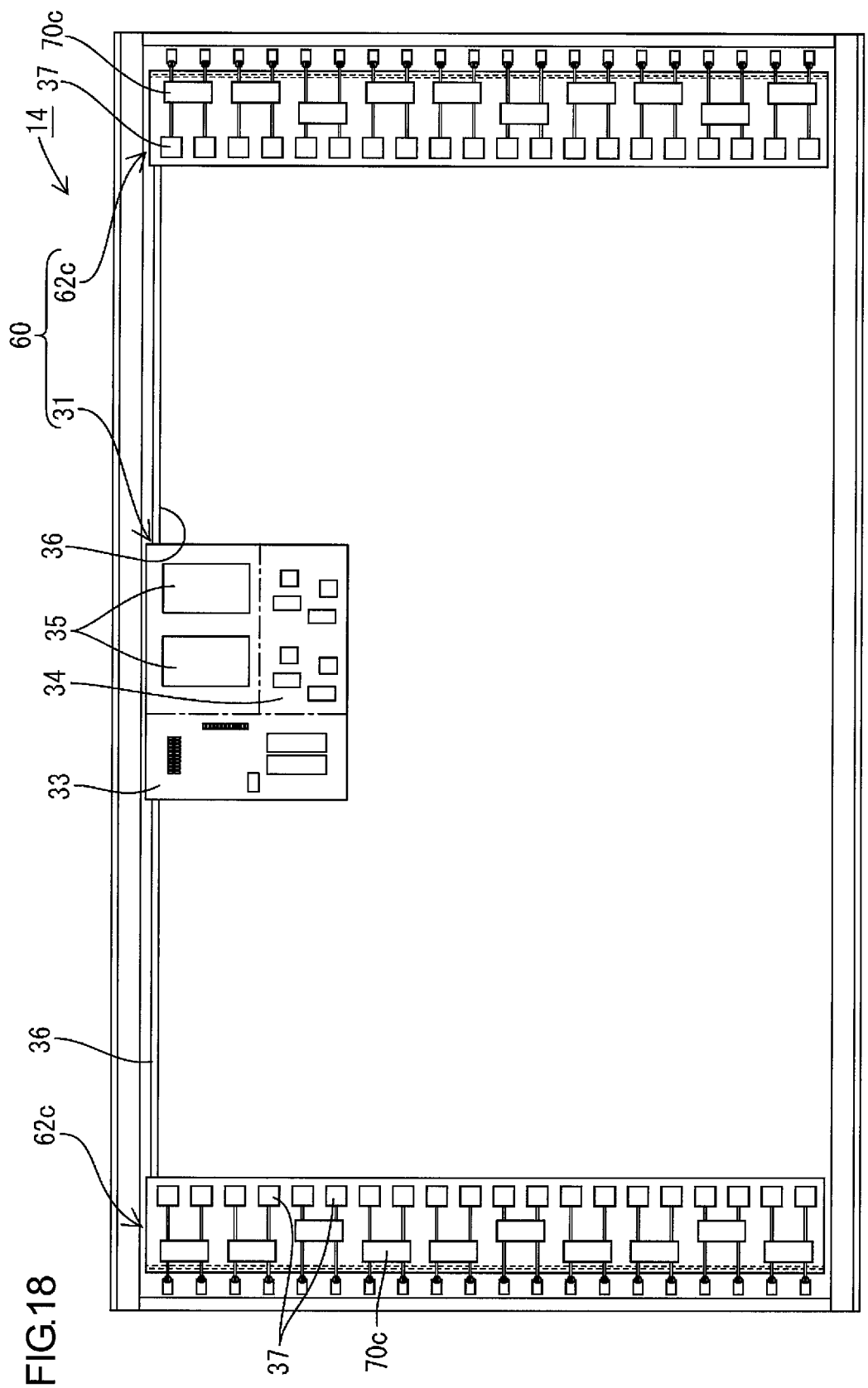
FIG. 18 is a plan view illustrating a modification of a mode of arrangement of the connectors on the second inverter board.

In addition, as a different arrangement mode of connectors on the second inverter board, as illustrated in FIG. 18, two connectors 70c and one connector 70c may be alternately arranged so as to form two rows. Specifically, a first connector 70c and a second connector 70c are arranged on a long-side edge part of a second inverter board 62c, while a third connector 70c adjacent to the second connector 70c is arranged on the inward side of the long-side edge part of the second inverter board 62c. By repeating this procedure, two adjacent connectors 70c are to be arranged in the same row and a connector 70c adjacent thereto is to be arranged in a different row so as to form two rows.

Fourth Embodiment

Next, a fourth embodiment of the present invention will be described with reference to FIG. 19. In the present fourth embodiment, a configuration will be presented where a relative positional relationship between a elongated raised portion and a connector has been modified from the third embodiment described above. Otherwise, the present fourth embodiment is the same as the embodiments described above. Like parts to the embodiments described above will be denoted using like reference characters and redundant descriptions thereof will be omitted.

Figure 19:
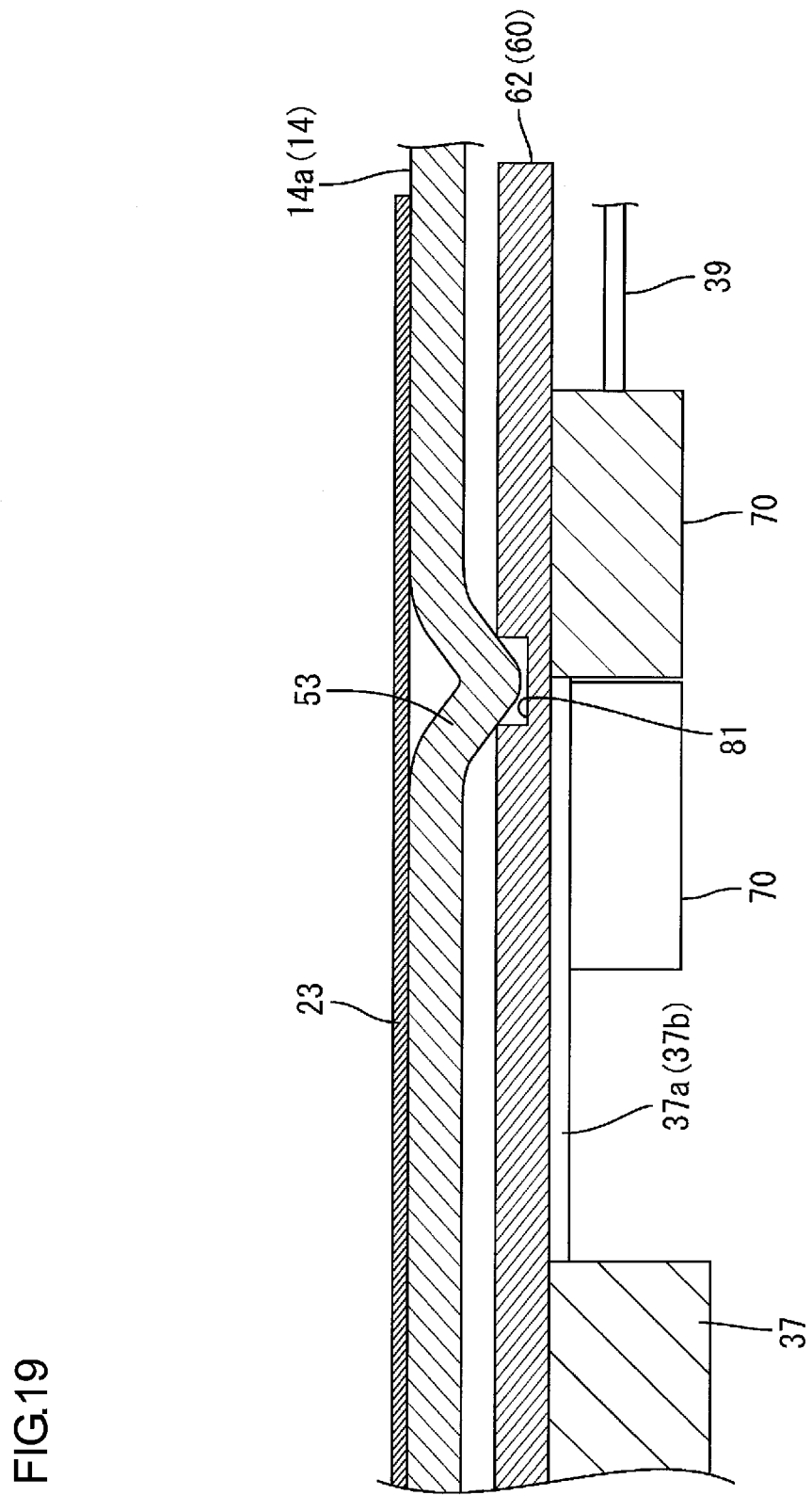
FIG. 19 is a cross-sectional view illustrating a mode of mounting of a chassis and a second inverter board included in a backlight unit according to a fourth embodiment of the present invention.

FIG. 19 is a cross-sectional view illustrating a mode of mounting of a chassis and a second inverter board according to the present embodiment.

As illustrated in FIG. 19, flux-coupling elements 37 and connectors 70 are arranged on a front-surface side (an opposite side to a surface opposing a bottom plate 14a of a chassis 14) of a second inverter board 62 comprising an inverter board 60 along a longitudinal direction of the second inverter board 62 (a short-side direction of the chassis 14). The connectors 70 are arranged such that adjacent connectors 70 thereof are alternately positioned with respect to each other in the short-side direction of the second inverter board 62 (the long-side direction of the chassis 14) so as to alternately form two rows on the long-side edge part of the second inverter board 62 and on the inward side of the long-side edge part. A groove 81 is extendedly provided on the rear-surface side (the surface opposing the bottom plate 14a) of the second inverter board 32 at a position between the row of connectors 70 aligned on the side of the long-side edge part of the second inverter board 62 and the row of connectors 70 aligned on the inward side of the row of connectors 70 aligned on the side of the long-side edge part so as to conform to the alignments.

Meanwhile, a elongated raised portion 53 that is a portion of the bottom plate 14a of the chassis 14 protruding toward the side of the second inverter board 62 is formed on the bottom plate 14a at a position opposing the groove 81. Moreover, the elongated raised portion 53 is configured so as to have the same shape as in the first embodiment described above.

When the second inverter board 62 is mounted on the chassis 14, a state is created in which a part of the elongated raised portion 53 formed on the bottom plate 14a of the chassis 14 is fitted into the groove 81 formed on the rear-surface side of the second inverter board 62. In this case, the groove 81 is extendedly provided between the connectors 70 aligned in two rows so as to conform to the rows. The elongated raised portion 53 is also formed along the rows of the connectors 70 at a position between the connectors 70 aligned in two rows among the chassis 14 so as to straddle (partially overlap) the connectors 70 forming two rows. Therefore, the second inverter board 62 is to be supported by the elongated raised portion 53 from the side of the chassis 14 at alignment portions of the connectors 70 aligned in two rows on the side of the long-side edge part of the second inverter board 62 and on the inward side of the long-side edge part.

As described above, at a portion where the plurality of connectors 70 is aligned in two rows, pressing force is concentrated along the alignments and the second inverter board 62 becomes vulnerable to distortion during mounting of the connectors 70. In consideration thereof, by forming the elongated raised portion 53 so as to straddle the two rows in which the connectors 70 are arranged, the pressing force-concentrated part is to be directly supported by the elongated raised portion 53. Therefore, distortion of the second inverter board 62 can be suppressed more effectively.

Fifth Embodiment

Next, a fifth embodiment of the present invention will be described with reference to FIG. 20. In the present fifth embodiment, a configuration will be presented where a relative positional relationship between an elongated raised portion and a connector has been further modified from the fourth embodiment described above. Otherwise, the present fifth embodiment is the same as the embodiments described above. Like parts to the embodiments described above will be denoted using like reference characters and redundant descriptions thereof will be omitted.

Figure 20:
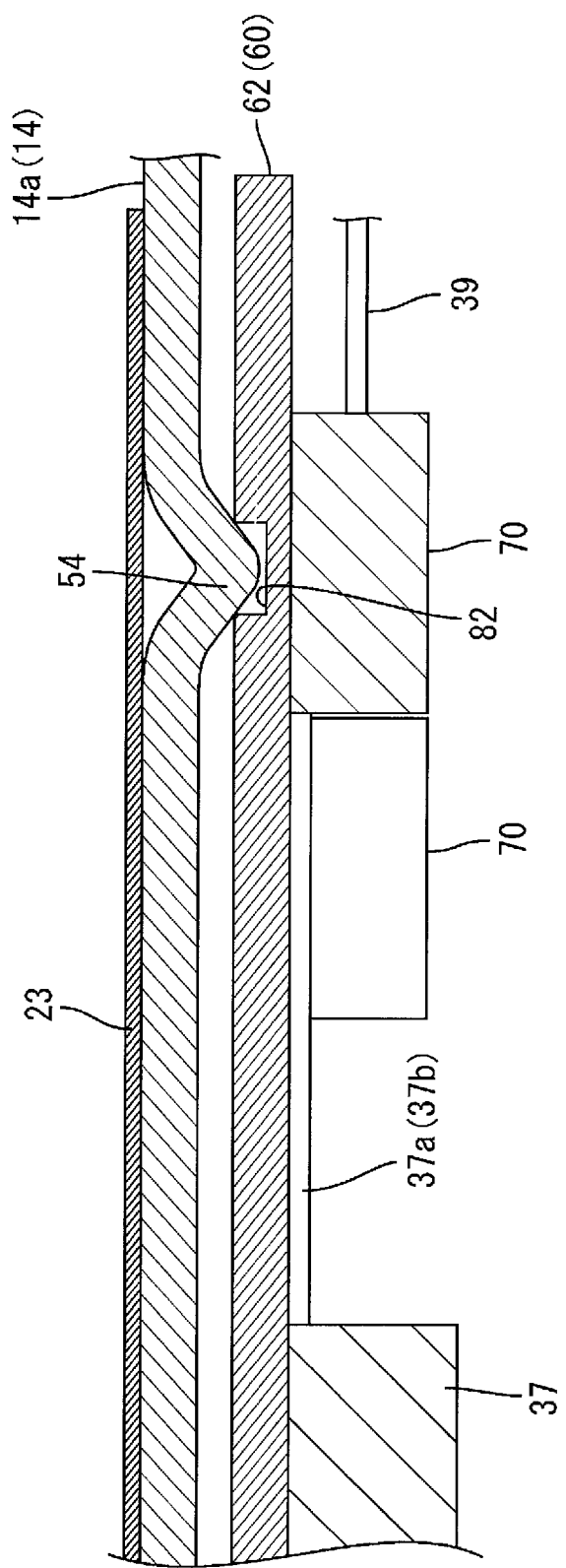
FIG. 20 is a cross-sectional view illustrating a mode of mounting of a chassis and a second inverter board included in a backlight unit according to a fifth embodiment of the present invention.

FIG. 20 is a cross-sectional view illustrating a mode of mounting of a chassis and a second inverter board according to the present embodiment.

As illustrated in FIG. 20, flux-coupling elements 37 and connectors 70 are arranged on a front-surface side (an opposite side to a surface opposing a bottom plate 14a of a chassis 14) of a second inverter board 62 along a longitudinal direction of the second inverter board 62 (a short-side direction of the chassis 14). The connectors 70 are arranged such that adjacent connectors 70 thereof are alternately positioned with respect to each other in the short-side direction of the second inverter board 62 (the long-side direction of the chassis 14), and are alternately aligned so as to form two rows on the long-side edge part of the second inverter board 62 and on the inward side of the long-side edge part. A groove 82 is extendedly provided on a rear-surface side (a surface opposing the bottom plate 14a) of the second inverter board 32 directly underneath the connectors 70 aligned on the side of the long-side edge part of the second inverter board 62 so as to conform to the alignment.

Meanwhile, a elongated raised portion 54 that is a portion of the bottom plate 14a of the chassis 14 protruding toward the side of the second inverter board 62 is formed on the bottom plate 14a at a position opposing the groove 82. Moreover, the elongated raised portion 54 is configured so as to have the same shape as in the first embodiment described above.

When the second inverter board 62 is mounted on the chassis 14, a state is created in which a part of the elongated raised portion 54 formed on the bottom plate 14a of the chassis 14 is fitted into the groove 82 formed on the rear-surface side of the second inverter board 62. In this case, the groove 82 is extendedly provided directly underneath the connectors 70 aligned on the side of the long-side edge part of the second inverter board 62, and the elongated raised portion 54 is also entirely formed at a position corresponding to directly underneath the connectors 70 aligned on the side of the long-side edge part of the second inverter board 62 among the chassis 14. Therefore, the second inverter board 62 is to be supported by the elongated raised portion 54 from the side of the chassis 14 at the alignment portion of the connectors 70 aligned on the side of the long-side edge part of the second inverter board 62.

As described above, at a portion where the plurality of connectors 70 is aligned in two rows, pressing force is concentrated along the alignments of the connectors 70 and the second inverter board 62 becomes vulnerable to distortion during mounting of the connectors 70. In consideration thereof, by forming the elongated raised portion 54 at a position corresponding to directly underneath the connectors 70 aligned on the side of the long-side edge part of the second inverter board 62, the pressing force-concentrated part is to be directly supported by the elongated raised portion 54. Therefore, distortion of the second inverter board 62 can be suppressed more effectively.

Moreover, while a configuration in which the elongated raised portion 54 is formed at a position corresponding to directly underneath the connectors 70 arranged on the side of the long-side edge part of the second inverter board 62 among the connectors 70 aligned in two rows on the second inverter board 62 has been adopted in the present embodiment, a elongated raised portion may alternatively be formed at a position corresponding to directly underneath the connectors 70 aligned on the inward side of the second inverter board 62.

Other Embodiments

While preferred embodiments of the present invention have been disclosed, the present invention is not limited to the embodiments disclosed by the above description and accompanying drawings and, for example, the embodiments described below also fall within the technical scope of the present invention.

(1) The second inverter boards arranged so as to overlap one end part of the cold cathode tube and the other end part of the cold cathode tube, respectively. The second inverter board may be arranged so as to overlap one of the end parts.

Figure 21:
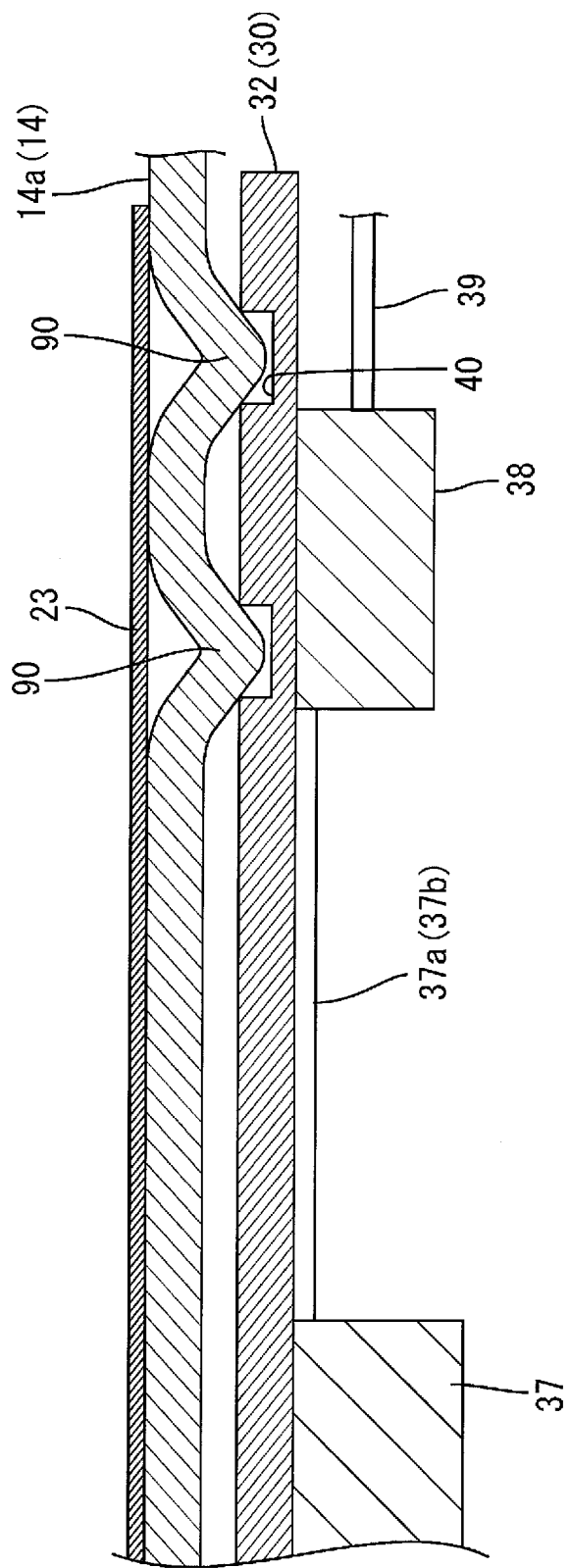
FIG. 21 is a cross-sectional view illustrating a modification of a mode of mounting of the chassis and the second inverter board.

(2) While a single elongated raised portion is to be formed with respect to a group of connectors aligned in a straight line in the embodiments described above, a plurality of elongated raised portions may alternatively be formed such as exemplified in FIG. 21 by two juxtaposed elongated raised portions 90. In this case, the same number of corresponding grooves as the elongated raised portions 90 is to be favorably formed.

Figure 22:
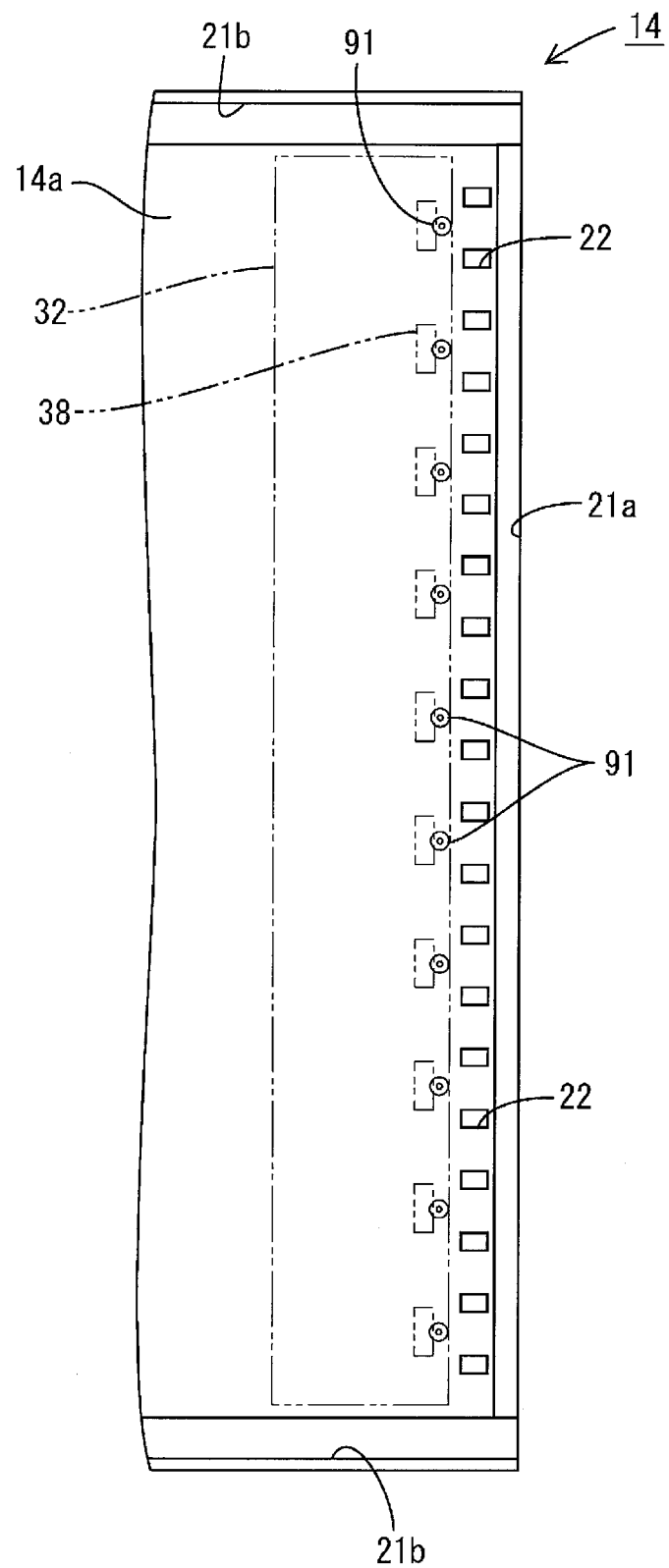
FIG. 22 is a plan view illustrating a modification of a raised portion to be formed on the chassis.
Figure 23:
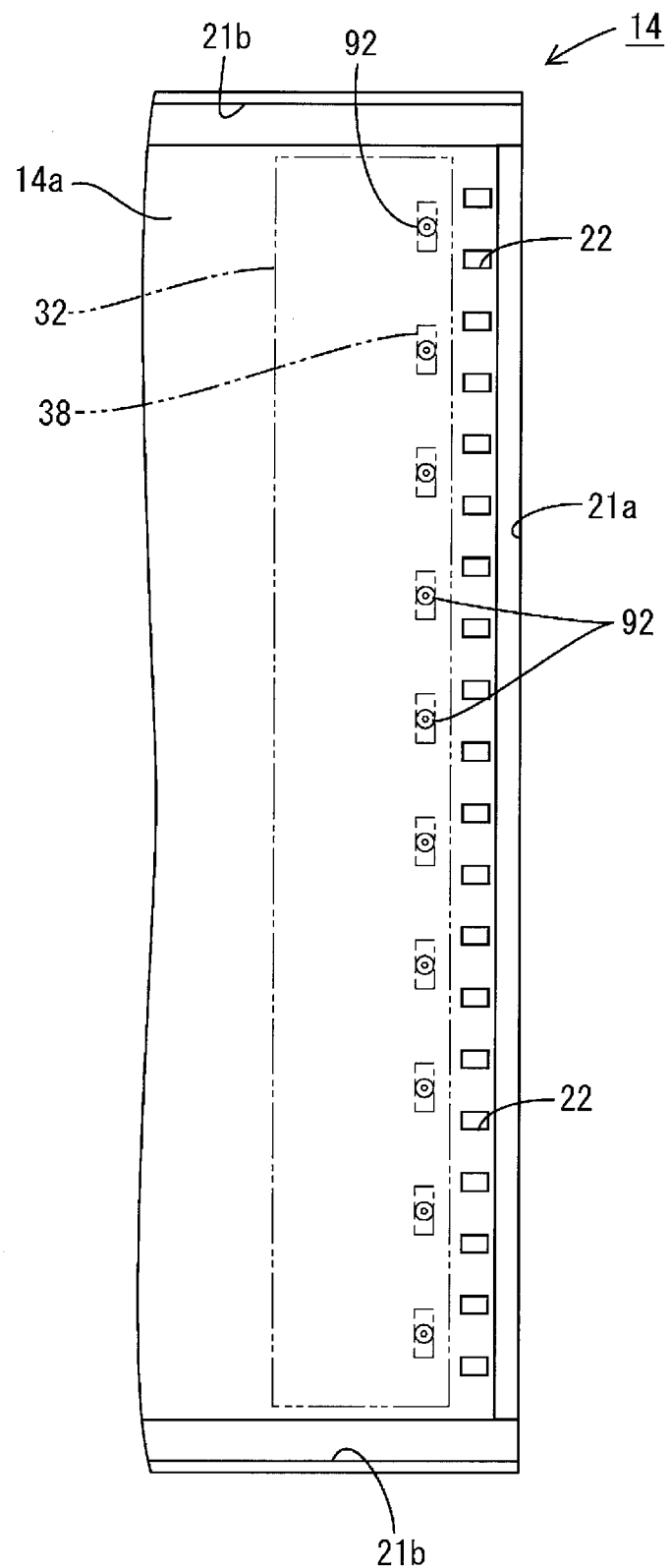
FIG. 23 is a plan view illustrating a modification of a raised portion to be formed on the chassis.

(3) While a striated elongated raised portion has been selected in the embodiments described above as a raised portion to be formed on the chassis, the form of the raised portion is not limited thereto and, for example, a plurality of mutually independent raised portions may be formed. Specifically, as illustrated in FIG. 22, a plurality of raised portions 91 that is circular in plan view may be formed with a portion of the raised portions overlapping connectors along an alignment of the connectors. In addition, as illustrated in FIG. 23, a plurality of raised portions 92 that is circular in plan view may be formed at a position corresponding to directly underneath connectors aligned in a straight line.

(4) While the groove formed on the second inverter board has a rectangular cross-section in the embodiments described above, the shape of the groove is not limited thereto and may have an arbitrary shape such as a half circle or a trapezoid.

(5) While the elongated raised portion formed on the chassis has an approximately triangular cross-section in the embodiments described above, the shape of the elongated raised portion is not limited thereto and may have an arbitrary shape such as a half circle or a trapezoid.

(6) While cases where a cold cathode tube is used as a light source have been described in the embodiments above, cases using other light sources such as a hot cathode tube are to be also included in the present invention.

The invention claimed is:
1. An illumination device comprising:
a light source;
a chassis housing the light source; and
a power supply board arranged to supply drive power to the light source, wherein:
the power supply board is mounted on a surface of the chassis on an opposite side from the light source;

the surface of the chassis includes at least one raised portion that rises toward the power supply board;
the power supply board is arranged so as to overlap the raised portion;
the power supply board includes a recessed portion in an area corresponding to the raised portion; and
the recessed portion is provided such that one of a top portion of the raised portion and an entire raised portion is fitted therein.

2. The illumination device according to claim 1, wherein:
the light source is a linear light source; and
the power supply board is arranged so as to overlap an end part of the linear light source.

3. The illumination device according to claim 1, further comprising at least one connector arranged to make an electrical connection between the power supply board and the light source, the connector being arranged on the power supply board,
wherein the raised portion of the chassis is arranged so as to overlap the power supply board at least in an area in which the connector is arranged.

4. The illumination device according to claim 3, wherein the connector includes a first connector mounted on the power supply board and a second connector attached to the first connector so as to be detachable in a direction that crosses the board surface of the power supply board.

5. The illumination device according to claim 3, wherein:
the at least one connector includes a plurality of connectors; and
the connectors are arranged on a line on the power supply board.

6. The illumination device according to claim 5, wherein:
some of the connectors are arranged on a line; and
the raised portion is provided in a linear shape along the line on which the connectors are arranged.

7. The illumination device according to claim 5, wherein:
some of the connectors are arranged on a line; and
the at least one raised portion includes a plurality of raised portions arranged in areas corresponding to the connectors arranged on the line.

8. The illumination device according to claim 5, wherein:
some of the connectors are arranged on a line; and
the at least one raised portion is provided in a linear shape under the connectors arranged on the line.

9. The illumination device according to claim 5, wherein:
some of the connectors are arranged on a line; and
the at least one raised portion includes a plurality of raised portions arranged under the connectors arranged on the line.

10. The illumination device according to claim 3, wherein:
the at least one connector includes a plurality of connectors arranged on the power supply board;
some of the connectors are arranged on a line; and
at least one of the connectors adjacent to one of the some of the connectors is arranged off the line.

11. The illumination device according to claim 10, wherein the some of the connectors and the connectors adjacent to the some of the connectors are arranged in a staggered layout.

12. The illumination device according to claim 10, wherein the connectors are alternately arranged.

13. A display device comprising:
the illumination device according to claim 1; and
a display panel arranged to provide display using light from the illumination device.

14. The display device according to claim 13, wherein the display panel is a liquid crystal panel using liquid crystals.

15. A television receiver apparatus comprising the display device according to claim 13.

* * * * *